US006822945B2

United States Patent
Petrovykh

(10) Patent No.: US 6,822,945 B2
(45) Date of Patent: Nov. 23, 2004

(54) METHOD AND APPARATUS FOR ANTICIPATING AND PLANNING COMMUNICATION-CENTER RESOURCES BASED ON EVALUATION OF EVENTS WAITING IN A COMMUNICATION CENTER MASTER QUEUE

(75) Inventor: Yevgeniy Petrovykh, Walnut Creek, CA (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 107 days.

(21) Appl. No.: 10/229,514

(22) Filed: Aug. 27, 2002

(65) Prior Publication Data

US 2003/0037113 A1 Feb. 20, 2003

Related U.S. Application Data

(63) Continuation-in-part of application No. 09/766,271, filed on Jan. 18, 2001, which is a continuation-in-part of application No. 09/710,042, filed on Nov. 8, 2000.

(51) Int. Cl.[7] .............................................. H04L 12/28
(52) U.S. Cl. ................................... 370/270; 379/266.01
(58) Field of Search ................................. 370/259, 262, 370/270, 601; 379/265.01, 266.01, 266.02, 265.02

(56) References Cited

U.S. PATENT DOCUMENTS

| | | | | |
|---|---|---|---|---|
| 5,825,869 A | * | 10/1998 | Brooks et al. | 379/256.12 |
| 6,327,364 B1 | * | 12/2001 | Shaffer et al. | 379/265.02 |
| 6,611,590 B1 | * | 8/2003 | Lu et al. | 379/265.09 |
| 6,650,748 B1 | * | 11/2003 | Edwards et al. | 379/266.04 |
| 6,661,889 B1 | * | 12/2003 | Flockhart et al. | 379/265.05 |
| 6,724,884 B2 | * | 4/2004 | Jensen et al. | 379/265.01 |

* cited by examiner

Primary Examiner—Kenneth Vanderpuye
(74) Attorney, Agent, or Firm—Donald R. Boys; Central Coast Patent Agency, Inc.

(57) ABSTRACT

A software application for recommending workforce resource allocation in a communication center based on requirements of events represented in a communication-center queue has a first interface for accessing information from the queue; a second interface for accessing information from a data source about workforce availability and state information; a processing component for processing queue information and workforce information; and a message generation and delivery component for generating a workforce allocation recommendation based on processing results and sending the recommendation to a target entity. In a preferred embodiment, the application periodically accesses the queue and the data source to obtain the most recent information for processing and generates periodic recommendations based on real-time requirements of events and availability states of resources, the recommendations sent ahead of time before the resources are required.

36 Claims, 13 Drawing Sheets

METHOD AND APPARATUS FOR ANTICIPATING AND PLANNING COMMUNICATION-CENTER RESOURCES BASED ON EVALUATION OF EVENTS WAITING IN A COMMUNICATION CENTER MASTER QUEUE

CROSS-REFERENCE TO RELATED DOCUMENTS

The present invention is a continuation-in-part (CIP) to a U.S. patent application Ser. No. 09/766,271 entitled "Personal Interaction Interface for Communication-Center Customers" filed on Jan. 18, 2001, which is a CIP to a U.S. patent application Ser. No. 09/710,042 entitled "System for improved reporting of communication center presence information to prospective clients", filed on Nov. 08, 2000, disclosures of which are incorporated herein in their entirety by reference.

FIELD OF THE INVENTION

The present invention is in the general field of telephony including multimedia communications. The present invention has particular application to methods and apparatus for anticipating the needs of clients of a communication center having events waiting in a communication center queue by interacting directly with the queue and planning communication resource availability accordingly, preferably using Instant Message Presence Protocol (IMPP) messaging.

BACKGROUND OF THE INVENTION

In the field of telephony communication, there have been many improvements in technology over the years that have contributed to more efficient use of telephone communication within hosted call-center environments. Most of these improvements involve integrating the telephones and switching systems in such call centers with computer hardware and software adapted for, among other things, better routing of telephone calls, faster delivery of telephone calls and associated information, and improved service with regard to client satisfaction. Such computer-enhanced telephony is known in the art as computer-telephony integration (CTI).

Generally speaking, CTI implementations of various design and purpose are implemented both within individual call-centers and, in some cases, at the telephone network level. For example, processors running CTI software applications may be linked to telephone switches, service control points (SCP), and network entry points within a public or private telephone network. At the call-center level, CTI-enhanced processors, data servers, transaction servers, and the like, are linked to telephone switches and, in some cases, to similar CTI hardware at the network level, often by a dedicated digital link. CTI processors and other hardware within a call-center is commonly referred to as customer premises equipment (CPE). It is the CTI processor and application software is such centers that provides computer enhancement to a call center.

In a CTI-enhanced call center, telephones at agent stations are connected to a central telephony switching apparatus, such as an automatic call distributor (ACD) switch or a private branch exchange (PBX). The agent stations may also be equipped with computer terminals such as personal computer/video display units (PC/VDU) so that agents manning such stations may have access to stored data as well as being linked to incoming callers by telephone equipment. Such stations may be interconnected through the PC VDU by a local area network (LAN). One or more data or transaction servers may also be connected to the LAN that interconnects agent stations. The LAN is, in turn, typically connected to the CTI processor, which is connected to the call switching apparatus of the call center.

In recent years, advances in computer technology, telephony equipment, and infrastructure have provided many opportunities for improving telephone service in publicly switched and private telephone intelligent networks. Similarly, development of a separate information and data network known as the Internet, together with advances in computer hardware and software have led to a new multimedia telephone system known in the art by several names. In this new systemology, telephone calls are simulated by multimedia computer equipment, and data, such as audio data, is transmitted over data networks as data packets. In this system the broad term used to describe such computer-simulated telephony is Data Network Telephony (DNT).

Recent improvements to available technologies associated with the transmission and reception of data packets during real-time DNT communication have enabled companies to successfully add DNT, principally IPNT capabilities to existing CTI call centers. Such improvements, as described herein and known-to the inventor, include methods for guaranteeing available bandwidth or quality of service (QOS) for a transaction, improved mechanisms for organizing, coding, compressing, and carrying data more efficiently using less bandwidth, and methods and apparatus for intelligently replacing lost data via using voice supplementation methods and enhanced buffering capabilities.

In addition to Internet protocol (IPNT) calls, a DNT center may also share other forms of media with customers accessing the system through their computers. E-mails, video mails, fax, file share, file transfer, video calls, and so forth are some of the other forms of media, which may be used. This capability of handling varied media leads to the term multimedia communications center. A multimedia communications center may be a combination CTI and DNT center, or may be a DNT center capable of receiving COST calls and converting them to a digital DNT format. The term communication center will replace the term call center hereinafter in this specification when referring to multimedia capabilities.

In systems known to the inventors, incoming IPNT calls are processed and routed within an IPNT-capable communication center in much the same way as COST calls are routed in a CTI-enhanced call-center, using similar or identical routing rules, waiting queues, and so on, aside from the fact that there are two separate networks involved. Communication centers having both CTI and IPNT capability utilize LAN-connected agent-stations with each station having a telephony-switch-connected headset or phone, and a PC connected, in most cases via LAN, to the network carrying the IPNT calls. Therefore, in most cases, IPNT calls are routed to the agent's PC while conventional telephony calls are routed to the agent's conventional telephone or headset.

A network-based system known to the inventor enables users of the system to obtain current agent-status information related to agents of an information-source facility connected to the network before initiating contact with the agent or agents of the information-source facility. The system comprises a status-server node connected to the information-source facility (communication center) and to the network, an interface-server node connected to the status node and to the network, the status-server node accessible to the interface node, a user-operated network-capable appliance connected to the network, the interface node accessible to the network-capable appliance, and a software application distributed on at least the status and interface server nodes, the software application enabling distribution of the agent-status information to the user-operated appliance. In some embodiments the system uses IMPP-IETF RFC 2778 protocol.

The user operating the network-capable appliance connects to the network and accesses the interfacing server node and requests the agent-status information, the agent-status information is then accessed from the status server node connected to the communication center by the interfacing server node and delivered to the requesting user over the operating network. Such a system saves phone costs for customers and/or agents as well as reduces utilization requirements of communication-center interface technologies such as IVR technology.

The network-based system described above can, in one aspect, enable communication center agents using the system to obtain current status information related to clients of an information-source facility connected to the network in order to optimize callback connection success from the agents to the monitored clients. The capability is incorporated as an enhancement to the system providing agent status information to clients as described further above.

The system comprises a status-server node connected to the information-source facility (communication center) and to the network, an interface server node connected to the status node and to the network, the interface node accessible to the status server node, a user-operated network-capable appliance connected to the network, the interface node accessible to the network-capable appliance, and a software application distributed on at least the status and interface server nodes, the software application enabling distribution of the client-status information to the agent-operated appliance.

An agent operating the network-capable appliance monitors the network and accesses the status server node and requests the client-status information, the client-status information is then accessed from the interface server node by the status server node and delivered to the requesting agent over the operating network. Such a system saves agent time and communication costs and reduces utilization requirements for communication center interface technologies by automatically providing agents with client real-time activity prior to initiation of service contact.

The above-described system uses a presence protocol such as IMMP-IETF RFC 2778 in order to communicate both the agent status information to a requesting client and to communicate active client status to a requesting agent. In some cases, a third party providing a hosting server within the operating network, which in that case would be the Internet network, hosts the system.

According to another aspect of the above-described system, an application is provided for enabling a client to interact with communication-center resources using IMPP. The application has an interactive client interface component operable by the client for posting client data and for receiving and displaying agent and interaction data from the communication center, a brokering component for managing client and communication center data and communication, and a status monitoring and reporting component for monitoring and reporting communication center and client status. The application is characterized in that a client using the user interface is enabled to access and alter communication center data, and also to initiate live interaction with the communication center.

While presence information is flexible and useful for reporting information about agents to clients and about clients to agents, it has occurred to the inventors that there also exists an opportunity for using such a presence protocol for managing the communication center itself in terms of internal policy, member-to-member communication within the center whether agent-to-agent, machine-to-machine, agent-to-machine, or machine-to-agent.

A presence monitoring and reporting application is known to the inventors and is used in a multimedia communication-center environment to report presence information of networked entities in real time. The application includes a software agent for generating a presence information model; a data store for storing presence information tuples; and a monitor for detecting presence information updates and for synchronizing the updates with information in the data store. In a preferred embodiment the application is deployed and integrated to a communication center infrastructure wherein any given one or more of the entities may singularly or in plural spawn one or more agents whereupon the agents each spawn a container that is populated with current targeted presence and state information in most recent updated form and wherein the updates are synchronized with data in the data store.

It is known to the inventors that multimedia communication centers work with a wide variety of differing media types and in many instances tend to separate those media types into separate queues for management reasons. For example, COST calls and IPNT calls may occupy separate queues as may e-mail and other media events. In more modern IPNT-capable centers, the concept of virtual queuing has recently been implemented in systems known to the inventor, but necessarily prior art at the time of this application. Virtual queuing is a concept of tokenizing information about media events waiting in real queues and processing those events (usually mixed) from the virtual queue by priority of event and other criteria.

It has occurred to the inventors that using presence reporting between communication-center entities can change the way queue information is monitored as well as the way information in the queue is processed with regard to notification of other human and machine entities involved in the processing and with regard to planning resources.

Therefore, what is clearly needed is a method and apparatus that enables queue processing of multimedia events from a master virtual queue, such that event requirements including resources can be anticipated and aggregated if necessary early on, before event processing, for the purpose of enabling manipulation ahead of time of appropriate types of and availability of resources to most quickly process the waiting events.

SUMMARY OF THE INVENTION

In a preferred embodiment of the present invention a software application for recommending workforce resource allocation in a communication center based on requirements of events represented in a communication-center queue is provided, comprising a first interface for making interface with and accessing information from the queue, a second interface for making interface with and accessing information from a data source about workforce availability and state information, a processing component for processing queue information and workforce information, and a message generation and delivery component for generating a workforce allocation recommendation based on results from processing and sending the recommendation to a target entity. The application is characterized in that the application periodically accesses the queue and the data source to obtain the most recent information for processing, and generates periodic recommendations based on real-time requirements of events and availability states of resources.

In some preferred embodiments communication-center queue is a virtual queue capable of representing multimedia events, and in some of these, represented events may include COST calls, VoIP calls, e-mails, voice-mails, video calls, session initiation events, and IMPP-based communication events.

In some embodiments the workforce includes both live agents and automated systems. Further, event requirements may include media type, requested routing destination identification, and event purpose information. In some cases the first interface includes a data network link from a server hosting the application and a server hosting the queue. Also in some cases the second interface includes a data network link from a server hosting the application and a server functioning as the data source hosting the workforce information. Further, in some cases the data source may serve information according to a presence protocol.

In some embodiments the processing component performs a comparative analysis between the queue requirements and the workforce information the results thereof used to form the recommendation. Also in some embodiments the recommendation is an IMPP-based message. Still further, the target entity may be a supervising agent responsible for workforce allocation. In other cases the target entity may be an automated system and the recommendation is a direct order to that system.

In still further embodiments of the invention there may be a third interface for making interface with and accessing data from a historical database for the purpose of generating probability statistics concerning incoming events yet to be registered into the queue, and in this case the generated probability statistics may be used to help generate recommendations. Also, the presence information may include availability information, individual agent schedule information, and resolute activity state information.

In another aspect of the invention, in a communication center environment, an automated system for generating workforce resource allocation recommendations based on requirements for queued events and current workforce presence and state parameters is provided, comprising a first server having network access to the queued events, a second server having network access to the first server and having network access to the workforce presence and state parameters, and a software application running on the first server, the application including a processing component for processing queue information and workforce information; and a message generation and delivery component for generating a workforce allocation recommendation based on results from processing and sending the recommendation to a target entity. The system is characterized in that the recommendation provides direction for allocation of resources ahead of a time when the considered events would require actual event handling.

In some embodiments of the system the communication-center queue is a virtual queue capable of representing multimedia events. Queued events may include COST calls, VoIP calls, e-mails, voice-mails, video calls, and session initiation events, and IMPP-based communication events. The workforce may include both live agents and automated systems, and current event requirements may include media type, requested destination identification, and event purpose information.

In some other embodiments of the system the workforce presence and state parameters are served by the second server according to IMPP-based messaging. In some cases the processing component performs a comparative analysis between the queue requirements and the workforce information the results thereof used to form the recommendation. The target entity may be a supervising agent responsible for workforce allocation, or an automated system and the recommendation is a direct order to that system. In some cases the presence information includes availability information, individual schedule information, and resolute activity state information.

In yet another aspect of the invention a method for anticipating resources needed for events represented in a communication-center queue is provided, comprising steps of (a) using a software application, accessing the queue to gain access to requirements and parameters of events represented therein; (b) quantifying and sorting the accessed requirements; (c) using the same software application, accessing a data source to gain access to presence and state information of center resources; (d) performing a comparative analysis of requirements against available resources; (e) generating a resource allocation recommendation based on the results of analysis; and (f) sending the recommendation to a target entity responsible for resource allocation.

In some embodiments of the method, in step (a), the software application includes a first interface for making interface with and accessing information from the queue; a second interface for making interface with and accessing information from a data source about workforce availability and state information; a processing component for processing queue information and workforce information; and a message generation and delivery component for generating a workforce allocation recommendation based on results from processing and sending the recommendation to a target entity. Also in some embodiments, in step (a), requirements and parameters include media type, requested event destination identification, event origination identification and event purpose information. In step (b) the requirements may be prioritized by pre-selected criteria. Further, in step (c) data access may be based on a push model. In further embodiments, in step (c), data access may be based on a pull model. The data source may be a server.

In further embodiments of the, in step (c), the presence and state information may include work schedules, shift change information, and resolute activity states of differing media types. Still further, in step (e), knowledge of un-allocated resources may also be incorporated in recommendation generation.

In some cases the target entity is a supervising agent. In other cases the target entity may be an automated system and the recommendation a direct order.

BRIEF DESCRIPTION OF THE DRAWING FIGURES

DESCRIPTION OF THE PREFERRED EMBODIMENTS

In accordance with a preferred embodiment of the present invention, the inventor provides a novel software-hardware driven system for improving the reporting of communication-center presence information to prospective communication-center clients. The method and apparatus of the present invention is described in enabling detail below.

Figure 1:
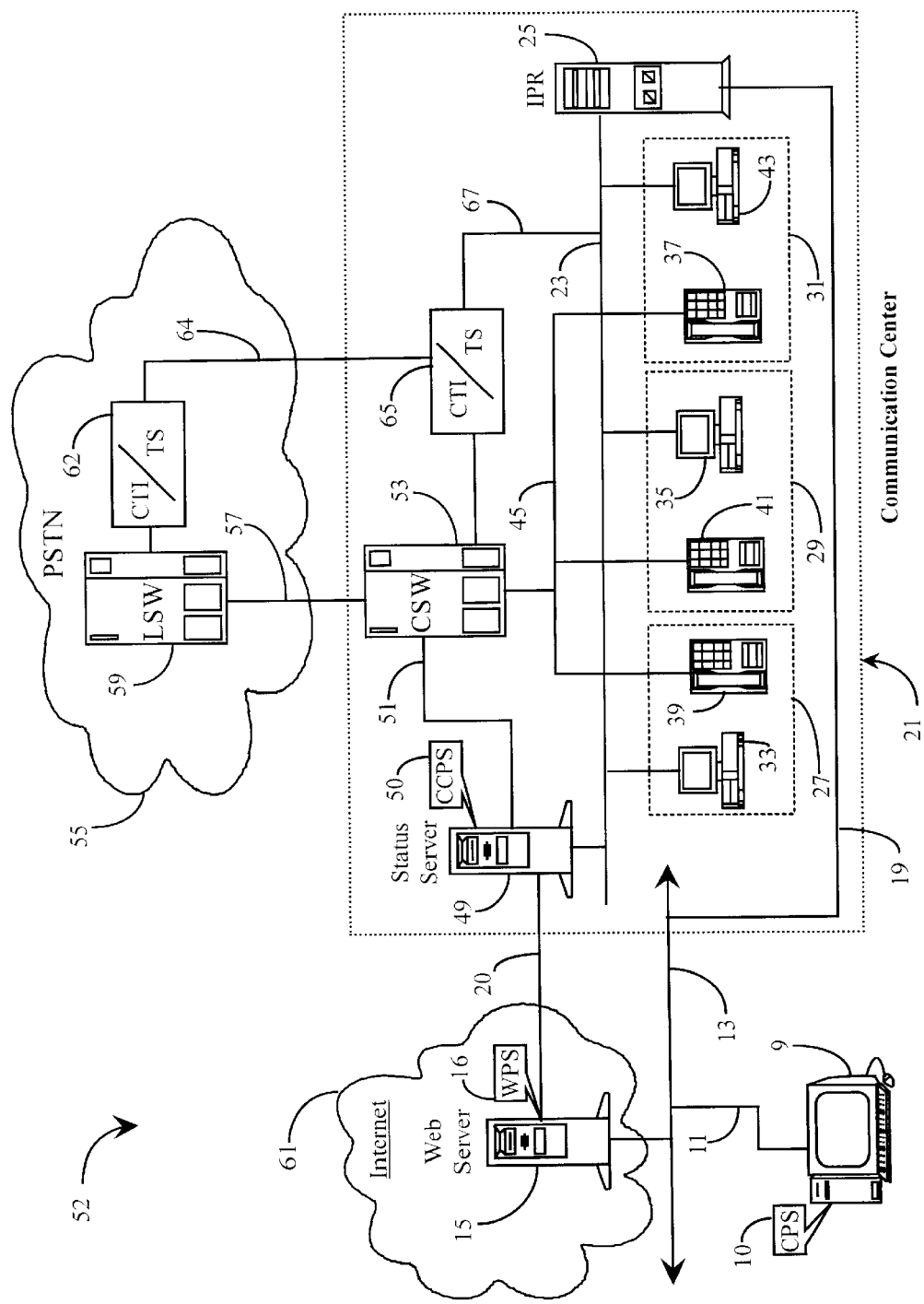
FIG. 1 is an overview of a communication network wherein reporting of communication-center presence information is practiced according to an embodiment of the present invention.

FIG. 1 is an overview of a communication network 52 wherein reporting of communication-center presence information is practiced according to an embodiment of the present invention. Communication network 52 comprises, in this example, a public-switched-telephone network (PSTN) 55, a data-packet-network (DPN) 61, a communication center 21, and an exemplary user 9.

PSTN 55, in this example, represents a preferred network connecting all connection-oriented-switched-telephony (COST) clients who call into communication center 21 for the purpose of doing business with the center. In another embodiment, a private telephone network may be utilized in place of or in combination with PSTN 55. The inventor chooses PSTN 55 because of its high public-access characteristic.

A local telephony switch (LSW) 59 is illustrated within PSTN 55 and represents automated switching capability within the network. LSW 59 may be an Automatic Call Distributor (ACD), a Public Branch Exchange (PBX), or any other type of telephony switching apparatus, in the broadest sense, including but not limited to DNT type switches/gateways as used in VoIP etc. LSW 59 is enhanced for computer-telephony-integration (CTI) by a CTI processor 62 connected thereto by a CTI connection. LSW 59 and CTI processor 62 may encompass various communication functionalities made available at network level by communication center 21. For example, an instance of CTI software known to the inventor and termed Transaction Server (TS) is provided within CTI processor 62 and adapted to enable communication-center 21 to certain call-switching and routing aspects performed by LSW 59. LSW 59 is connected to a central telephony switch (CSW) 53, illustrated within communication center 21, by a COST telephony trunk 57. CSW 53 may be any one of several types of call processing switches as previously described with respect to LSW 59 above.

CSW 53 is enhanced by a CTI processor 65, which is connected thereto by a CTI connection as was described with reference to LSW 59. CTI processor 65 also has an instance of TS software provided therein and adapted to communicate with TS software of processor 62. Processors 62 (network) and 65 (communication center) are connected by virtue of a separate data network 64 enabling the above-described communication between TS instances. By using network 64 to connect processor 62 and 65, communication center 21 may, in addition to controlling call switching and routing within PSTN 55, receive information about callers ahead of actual calls arriving at CSW 53 for internal processing. This enhancement is known as double-dipping by the inventors.

DPN 61 is, in this example, the well-known Internet network and will hereinafter be termed Internet 61. Internet 61 facilitates all Internet-protocol (IP) callers reaching communication center 21 through the Internet. Internet 61 may instead be a private or corporate Wide Area Network (WAN), or any other type of DPN as long as Internet communication protocols are supported. The inventor chooses Internet 61 as a preferred network because of its high public-access characteristic. IP callers calling into communication center 21 may interface from any Internet-connected server, which provides network access to communication center 21. Moreover, there may be many such servers distributed throughout network 61, each server being a point of access.

Internet 61 has an Internet backbone 13 illustrated therein. Backbone 13 represents all the lines, equipment, and connection points making up the Internet network as a whole, including sub networks. A Web Server (WS) 15 is provided within Internet 61 and is connected to backbone 13. WS 15 is adapted as an Internet file server as is known in the art. WS 15 represents one of a possible plurality of distributed customer-interfacing servers as described above. WS 15 serves electronic information pages, termed Web pages in the art, to requesting users. WS 15 is in this example hosted by the entity hosting communication center 21 and is utilized as a customer-interfacing server.

WS 15 is enhanced with a software instance termed Web-Presence-Software (WPS) 16, which enables prospective customers of communication-center 21 to view communication-center status related to agent availability for a call before deciding whether or not to actually place a call to communication center 21. More about WPS 16 is provided later in this specification.

An exemplary user, illustrated herein as a PC icon labeled with the element number 9, is connected to Internet backbone 13 by virtue of an Internet connection-line 11. User 9 is assumed, in this example, to be accessing WS 15 through standard Internet-connection capabilities as are known in the art. Typically, user 9 would obtain access to WS 15 through a dial-up connection utilizing an Internet-service-provider (ISP) and PSTN 55. However, there are many other means which may be used to obtain an Internet session with WS 15, many of which may not require dialing, e.g. DSL, cable modems etc. User 9 may utilize some other Internet-capable appliance than the PC illustrated herein. Likewise, connection line 11 may be a wireless link, a cable-modem connection, or any other known Internet connection means.

An instance of software termed Customer-Presence-Software (CPS) 10 is provided to execute on customer-premise-equipment (CPE), which in this case is a PC operated by user 9. CPS 10 is adapted to integrate communication-center status information into a customer's electronic interface, which is typically an electronic-information-page (Web page) served to the customer by WS 15 upon the customer's request. CPS 10 is an optional implementation in this example and is described in more detail later in this specification.

Communication center 21 has an Internet Protocol Router (IPR) 25 illustrated therein and adapted to handle incoming communication events sourced from WS 15 or any other interfacing Web server over network connection 19. IPR 25 routes incoming events to agent workstations adapted to receive the events. Agent workstations 27, 29, and 31 are illustrated within communication center 21 and adapted for communication-center activity covering both IP and COST transactions.

Agent telephones 39 (workstation 27), 41 (workstation 29), and 37 (workstation 31) are provided to handle COST communication events. Telephones 39, 41, and 37 are connected to CSW 53 by internal telephony wiring 45. Each agent workstation 27, 29, and 31 has a personal computer/video-display unit (PC/VDU) provided therein and adapted for handling IP communication events and for receiving information about callers calling from PSTN 55. These are PC/VDU 33, PC/VDU 35, and PC/VDU 43 respectively.

PC/VDU's 39, 35, and 43 are connected to a Local-Area-Network (LAN) 23. LAN 23 is, in this case, enhanced for Internet communication. IPR 25 is connected to LAN 23 and functions as an event router as previously described above. Other equipment may also be connected to LAN 23 such as a customer information server (CIS), a statistical server, and other communication-center systems and equipment not shown here but assumed to be present. Processor 65 is connected to LAN 23 by a LAN connection 67. In this way, information about COST callers being handled at LSW 59 may be routed over LAN 23 to destination PC/VDUs such as PC/VDU 35 in station 29 for example. Information about COST callers can also be handled by CSW 53 and routed over LAN 23 to destinations.

It will be apparent to one with skill in the art, that there may be many more workstations manned by communication-center agents than are illustrated in this embodiment without departing from the spirit and scope of the present invention. Similarly, there may be many more CTI functions represented herein without departing from the spirit and scope of the present invention. For example, IVR capability may be present at LSW 59, as well as at CSW 53. Automated systems such as automated fax systems and e-mail systems may also be present. There are many possibilities.

A status server 49 is provided within communication center 21 and adapted to monitor agent status and availability for receiving incoming communication events. Status server 49 is connected to LAN 23 by virtue of a LAN connection and monitors status at each workstation 27–31.

Software used for this purpose is not illustrated in this embodiment, but may be assumed to be present and operational within server 49. Agents manning stations 27–31 may monitored as to how many calls are in their respective queues whether they are COST queues, IP queues, or virtual queues of either type. Estimated waiting times for each queue of each agent are determined using call-handling statistics available within center 21. The information gathered to be made available t users may also be more extensive in scope, involving status of groups of agents and the like. Server 49 is capable of monitoring the status of each agent in real-time, but for practical purposes, may perform periodic status checks on a frequent basis such that real-time parameters are closely emulated. All current status information for every agent logged on to LAN 23 is compiled by server 49 and maintained as long as it is current.

An instance of Communication-Center-Presence Software (CCPS) 50 is provided within server 49 and adapted to interface with agent-monitoring software per instance of client request initiated through WS 15. Status server 49 is, in this embodiment connected directly to WS 15 by a separate high-speed data link 20. This implementation is not specifically required to practice the present invention; however the presence of link 20 enhances server-to-server communication. In the absence of data link 20, all communication between WS 15 and status server 49 would be conducted over Internet connection line 19, through IPR 25, and over LAN 23.

In practice of the present invention in one preferred embodiment, user 9 accesses Internet 61 over Internet connection line 11 and logs into WS 15. WS 15 serves a Web page as a response to a request from user 9. The Web page requested is hosted by the entity hosting communication center 21 and therefore contains information about communication center 21 including contact links, product information, telephone numbers, and any other pertinent information that may be found on a customer interface. In addition to the more typical information contained in the Web page representing communication center 21, a Web form (not shown) is made available for the purpose of taking a user's status request before requiring the user to place an actual call or initiate any contact with center 21.

The Web form, which is part of WPS 16, allows a user to enter such information as a product description, profile information, or a purpose for the desired contact with communication center 21. WPS 16, upon receiving and registering a request from user 9 sends an instant message/request over high-speed data link 20 to status server 49. CCPS 50 parses the request and obtains the most current status information from server 49 that matches the intent of the request. For example, if user 9 desires to purchase a four-wheel drive pickup, and communication center 21 is a car dealership, then CCPS 50 will only obtain status information connected to those agents within center 21 responsible for four-wheel drive sales.

Once status information is obtained by server 49, it is sent in the form of a response from server 49 to WS 15 whereupon it may be made available to user 9. In another embodiment, the status response may be sent to user 9 along with a subsequent Web page whereupon the information is caused to be a part of the web page at the location of user 9. In this case, CPS 10 would incorporate the information into the display of the subsequent Web page.

In still another embodiment, CCPS 50 may obtain all of the current agent-status information available from communication center 21 and send it to WS 15 over link 20 on a periodic or real-time basis. WPS 16 would, in this case, the enhanced with a filtering capability of filtering status information that closely matches a user request. Also in this case, an instant message would not need to be sent from WS 15 to status server 49. In a simple embodiment, status information viewable by user 9 would include any listed agents, number of calls in their queues, and estimated time waiting for agent availability with respect to each queue. For example, agent JIM may have 5 COST calls waiting, 5 IP calls waiting, and 8 unanswered e-mails. Therefore, agent Jim may be considered unavailable for immediate service. An estimated time waiting for Jim to respond may be averaged over all his media types, or maybe specified for each media type. User 9 may initiate a refresh action in order to obtain an update of status information. Contact links and other options may be presented in association with listed agents and agent status figures.

An interface of the type described above enables users to essentially browse agent-availability statistics before initiating any type of contact with communication center 21. In the event that a response message or downloaded interface reveals an available agent, user 9 could initiate contact with that agent using provided contact links or information.

It will be apparent to one with skill in the art that there are many configuration possibilities that exist with respect to reporting agent-availability status of agents within communication center 21 to requesting user 9 without departing from the spirit and scope of the present invention. Instant messaging or embedding the information into Web pages before or after download are techniques which may be employed to practice the present invention. Likewise, the status information may be made a part of a Web browser's tool bar or caused to open in an interactive window that pops up on a user's screen when the data is ready for display. In still another embodiment user station 9 may contact IPR 25 via connection 11, 13, 19 and retrieve pertinent information maintained through CCPS 50. This data may be displayed independently or integrated with a Web page from server 15. The functionality of WPS 16 at Web server 15 in retrieving information from communication center 21 via CCPS 50 is but a single example of how a system according to the present invention may function. It has been described that similar functionality may be provided by CPS 10 at a client station, and that there is no limitation to the client station operating only through a Web server. In a broad sense, the means of communication of client station 9 with communication center 21 is not limiting to the invention. The cooperation of gathering software (CCPS 50) at a communication center with an interface software (CPS 10) at a client station is novel.

In a further aspect, there are a variety of ways that the client stations in such a system may become enabled. In the system wherein retrieval of communication center status info is by software (WPS 16) at server 15, there is no need for additional software at the client station. A conventional browser will do. In the cases wherein software CPS 10 is enabled at a client station, that software may be sent to a client on a CD (for example), sent to the client in the background on accessing a Web page at server 15, downloaded intentionally by a client at station 9 as a plug-in to a Web browser, and in other ways as well.

Figure 2:
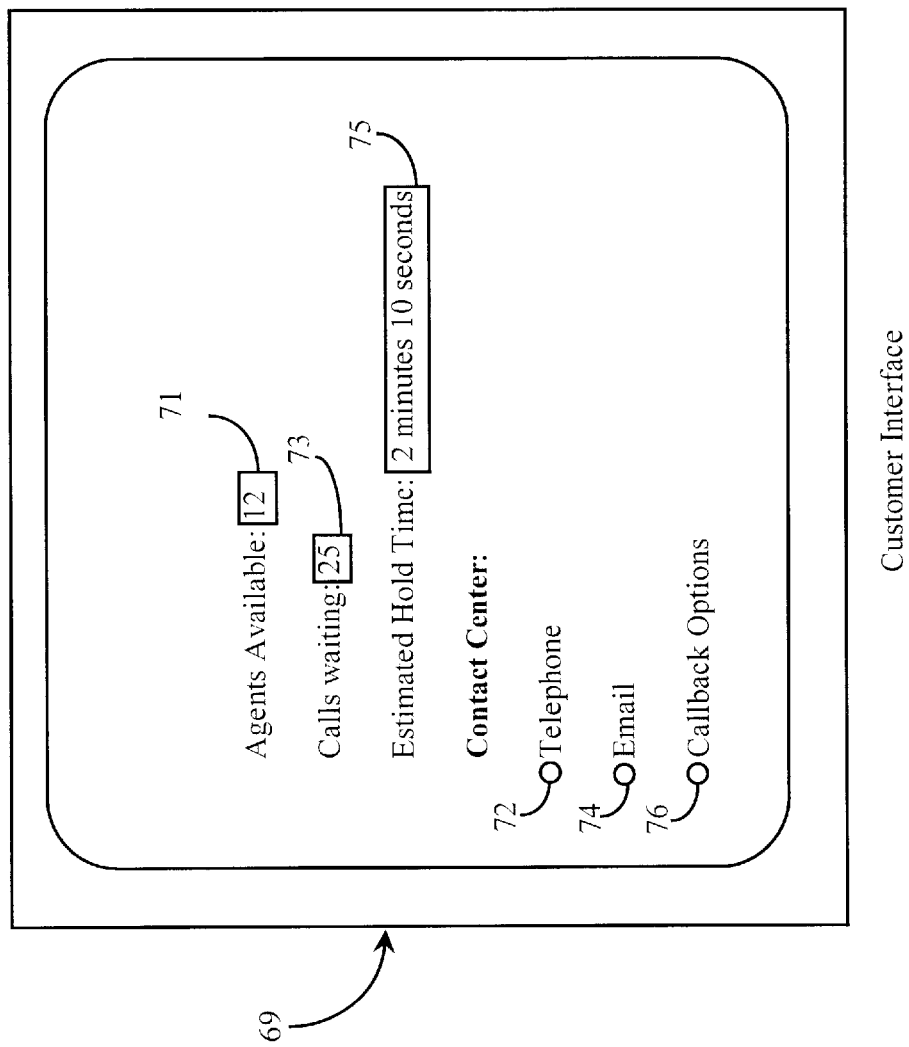
FIG. 2 is a plan view of a client-side media-interface containing status information according to an embodiment of the present invention.

FIG. 2 is a plan view of a client-side media-interface 69 that contains status information according to an embodiment of the present invention. Interface 69 is an exemplary representation of a customer interface displaying agent-availability status after it has been requested and delivered. Interface 69 may be an integrated part of a Web page (incl. e.g. script, Java, Java script, X-Windows script, plug-in etc. etc.), a pop-up information window, an instant message interface, or any other mechanism of computerized display.

In one embodiment, interface 69 is a product of CPS 10 of FIG. 1. In this embodiment, WPS 16 of FIG. 1 sends agent-availability information to user 9 over Internet connection 11, 13, 19, and CPS 10 incorporates information into an interactive display-window or into the actual Web page served by server 15. In another embodiment, interface 69 is a product of WPS 16 in FIG. 1 and is embedded into the actual Web page before it is served to user 9. In still another embodiment, interface 69 is a product of WPS 16 and is served to user 9 in the form of a standard instant-message interface using any of several known protocols. In this basic example, agent-availability status is generalized to a group of agents and displayed as 3 parameters. These are a number of available agents 71, a number of calls waiting 73, and an estimated hold time 75. In this case the information represents the most basic information available for the target group of agents. In this case there are 12 available agents that are handling the subject of request resulting in interface 69. There are 25 calls waiting in a queue shared by the 12 available agents. The average estimated hold time for one of the 12 agents to respond to an immediately placed call is 2 minutes and 10 seconds. In this example, three interactive options are presented within interface 69, in this case, below the agent-availability information. A contact option 72 is provided to allow a viewing customer to initiate an IP-to-IP telephone call, or an IP-to-COST telephone call. A contact option 74 enables a viewing customer to send an e-mail, which would be routed to one of the 12 available agents. A contact option 76 enables a viewing customer to initiate a callback from one of the 12 available agents. Using callback option 76 enables an invoking user to be entered into a virtual queue. A user in this case may expect a callback at approximately 2 minutes and 10 seconds after initiating the contact. In actual practice, the availability and variety of interactive contact options is dependent upon enterprise rules and available media. One with skill in the art will recognize that there are many alternative display scenarios which may be used with interface 69.

In a more advanced case, interface 69 may contain much more detailed information including information that a specific to a user request invoking the interface. For example, each of the available agents 71 may be listed separately instead of collectively as illustrated herein. The number of calls waiting may be broken down to reflect the exact number of calls waiting for each available agent. Furthermore, estimated hold times may be determined individually for each busy agent. Likewise, additional information about agents may be listed such as skill levels, language preferences, ranking within the organization, and so on. The level at which detailed agent-availability data may be compiled and presented depends entirely on the sophistication and configuration of agent monitoring software in use within communication center.

Figure 3:
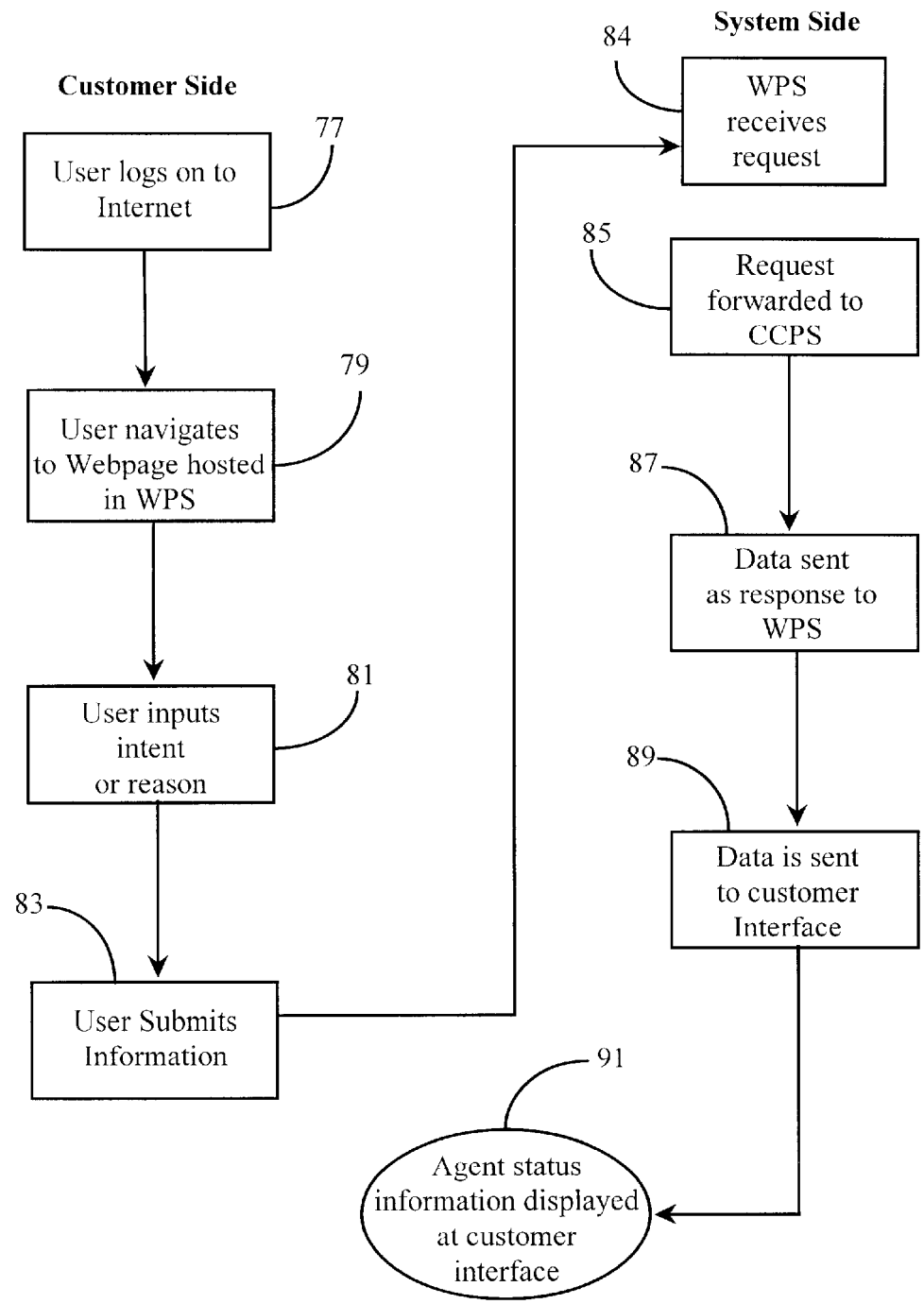
FIG. 3 is a flow diagram illustrating client and system procedural steps for practicing communication-center presence reporting according to an embodiment of the present invention.

FIG. 3 is a flow diagram illustrating client and system procedural steps for practicing communication-center presence reporting according to an embodiment of the present invention. At step 77, the user logs onto a DPN, which in a preferred case, is the Internet network. At step 79, the user of step 77 navigates to a Web site hosted by a communication center that the user desires to contact. At this point, a Web form may be present on a main Web page of the Web site navigated to in step 79. Such a Web form would prompt a user for his or her intent or reason for the desired contact. These reasons are as wide-ranging as are enterprises that might host such a Web form. For example, a list of product descriptions may be presented for selection. Levels of contact priority may be established in the case of priority queuing, amongst others possibly based on user ID. Available options are limited only by enterprise rules.

At step 81, a user enters the information solicited from him or her by the above-described Web form. At step 83, the user submits the Web form. At step 84, a Web presence server analogous to Web server 15 of FIG. 1 receives the request sent by the user of step 83. At step 85, the Web presence server forwards the request received in step 84 to a communication-center presence server analogous to server 49 of FIG. 1.

At this point, software analogous to CCPS 50 of FIG. 1 analyzes the received request and pulls the most current agent-availability data for the purpose of servicing the request. At step 86, the applicable data is sent in the form of a response back to the Web presence server of step 85. It is noted herein, that this communication between servers may occur over a separate high-speed data line as was described in reference to FIG. 1 above. Moreover, the server-to-server transaction may follow known request/response models used in Internet transactions.

When the applicable data is received at the Web presence server, software analogous to WPS 10 of FIG. 1 may integrate the information into a subsequent Web page to be sent back to the user of step 77, or it may formulate the response as an instant message, which is immediately dispatched act to user 77. At step 87 then, the applicable data is delivered to the user of step 77 and is displayed as an interactive interface analogous to interface 69 of FIG. 2 at step 89. At this point, the user of step 77 may initiate contact with the target communication center or wait for a better time for contact initiation based on user-analysis of the received data. It is also noted herein that the user requesting the data may refresh his or her request periodically to obtain the most current agent-availability data during a session period. In some cases, the requesting user may receive streaming data in real-time showing continual changes in agent-availability status over the time spent viewing the interface.

It will be apparent to one with skill in the art, that the customer/system process steps illustrated in this example may be altered in description and order without departing from the spirit and scope of the present invention. For example, the Web presence server of step 84 may have a local access to the most current agent-availability data at the instant of receiving a request. This was described an embodiment wherein agent-availability data from the target communication center is periodically pushed or continually streamed to the Web presence server. Moreover, the agent-availability data may be integrated into a Web page at server side or client side dependent upon software implementation. In one embodiment, the entire transaction process from request to response and display is conducted using an instant message protocol.

The method and apparatus of the present invention may be practiced on the Internet, a private or corporate WAN or LAN network or in any combination thereof. Web server 15 of FIG. 1 may be hosted by a single communication center or shared by a plurality of communication centers. In the latter case, it is more likely that agent-availability data will be pulled from the providing communication centers rather than pushed to the central location.

Client-Status Monitoring Capabilities

In another aspect of the present invention an enhancement is provided that enables agents operating from within communications-centers to monitor client availability status for the purpose of callback optimization. In particular, in cases where the client has many media available, a collection of all media statuses is generated, and then presented as an amalgamated status to an agent or robotic agent. Additionally, the preferred mode and time for a back connection may be available as well.

In one aspect of the system, client on-/off-line status information and the client's callback preferences are obtained at the same time using the same protocol. In another aspect of the system, client on-/off-line status information and the client's callback preferences are obtained independently, for instance using a presence service such as ICQ™ for the on-/off-line status information and HTTP or WAP for obtaining the client's callback preferences, or for instance during a previous communication between the client and an agent of the communication center.

In one aspect of the system, client-status information is obtained from a single client terminal, such as a PC. In another aspect of the system, partial client-status information is obtained from multiple independent client terminals, such as a PC and a cellular phone, and combined to provide complete client-status information to the subscribing agent. In one aspect of the system, client on-/off-line status information is obtained concerning a single terminal device, such as a PC. In another aspect of the system, client on-/off-line status information is obtained concerning multiple independent terminal devices, such as a PC and a cellular phone, and combined to provide complete client on-/off-line status information.

In one aspect of the system, client-status information is obtained using a single protocol, such as ICQ™. In another aspect of the system, partial client-status information is obtained using multiple protocols, such as ICQ™ and MSN Messenger Service™, and combined to provide complete client-status information to the subscribing agent. In one aspect of the system, client-status information is obtained via a single network, such as the Internet network. In another aspect of the system, partial client-status information is obtained via multiple networks, such as the Internet network and the cellular network, and combined to provide complete client-status information to the subscribing agent.

Figure 4:
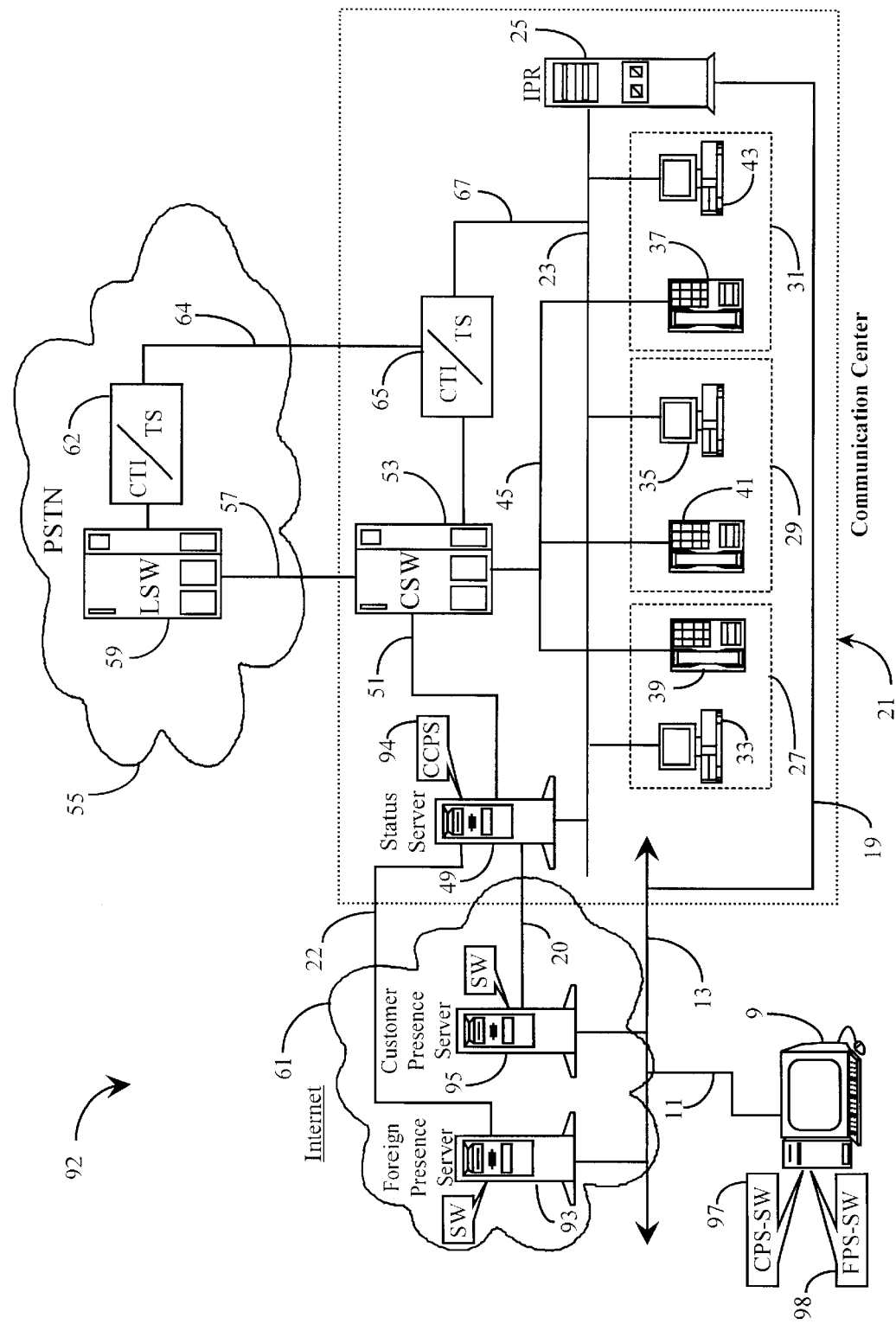
FIG. 4 is an overview of a communications network wherein agent monitoring of client status is practiced according to an embodiment of the present invention.

FIG. 4 is an overview of a communications network 92 wherein agent monitoring of client status is practiced according to an aspect of the present invention. Communication network 92 is somewhat analogous to communications network 52 of FIG. 1 above in terms of basic architecture and software implementation. Elements of network 52, which are not modified for the purpose of enabling the present invention, are not re-introduced with new element numbers. Newly provided or modified elements used in the practice of the present invention are introduced herein having new element numbers.

Communication network 92 comprises PSTN 55, DPN 61, communication center 21, and an exemplary user 9 as described above with reference to network 52 of FIG. 1.

PSTN 55, as described in the example of FIG. 1, represents a preferred network connecting all connection-oriented-switched-telephony (COST) clients whom call into communication center 21 for the purpose of doing business with the center. In another case, a private telephone network may be utilized in place of or in combination with PSTN 55. The inventor chooses PSTN 55 because of its high public-access characteristic.

LSW 59, illustrated within PSTN 55 and represents automated switching capability within the network. LSW 59 may be an Automatic Call Distributor (ACD), a Public Branch Exchange (PBX), or any other type of telephony switching apparatus, in the broadest sense, including but not limited to DNT type switches/gateways as used in Voice over IP (VoIP) etc. as was previously described. LSW 59 is CTI enhanced by CTI processor 62 connected thereto by a CTI connection. TS software provided within CTI processor 62 enables communication center 21 to control certain call-switching and routing aspects performed by LSW 59 as was described in FIG. 1.

LSW 59 is connected to CSW 53, illustrated within communication center 21, by COST telephony trunk 57. CSW 53 may be any of several types of call processing switches as previously described with respect to LSW 59 above. CSW 53 is enhanced by CTI processor 65, which is connected thereto by a CTI connection as was described with reference to LSW 59. CTI processor 65 also has an instance of TS software provided therein and adapted to communicate with TS software of processor 62. Data network 64 provides a capability of double dipping described in FIG. 1 above. Internet 61 facilitates all Internet-protocol (IP) callers reaching communication center 21 through the Internet. Internet 61 may be a private or corporate Wide Area Network (WAN) or any other type of DPN as long as Internet communication protocols are supported. The inventor chooses Internet 61 as a preferred network because of its high public-access characteristic, as stated with reference to FIG. 1. IP callers calling into communication center 21 may interface from any Internet-connected server, which provides network access to communication center 21. Moreover, there may be many such servers distributed throughout network 61, each server being a point of access. Internet 61 is represented by Internet backbone 13, which represents all the lines, equipment, and connection points making up the Internet network as a whole, including sub networks.

Status server 49 is illustrated in this example as having a communication-center-presence-server CCPS 94 (software) installed therein, which is an enhanced version of CCPS 50 described in the example of FIG. 1. CCPS 94 not only provides clients with agent status information over the WWW, but also allows agents working within center 21 the capability of subscribing to client status information. More detail regarding the just-described enhancement is provided below.

In this example, there are 2 exemplary file servers illustrated as connected to Internet backbone 13. These are a customer presence server (CPS) 95 and a foreign presence server (FPS) 93. It is noted herein that CPS 95 effectively replaces WS 15 of FIG. 1 and can be assumed to provide the formerly-described functionality of server 15 and associated web presence server (WPS software) 16 of the same example. CPS 95 functions as a file server enhanced with an instance of software (SW) 97, which may be described, in this embodiment as CPS software 97. CPS server 95 is, in this example, hosted by the same entity hosting communication center 21 and is utilized as a customer/agent interface.

CPS SW 97 is enhanced for the purpose of allowing an agent to subscribe to real-time customer availability information as it applies to the remote station occupied by the customer. In this case, the station refers to remote PC 9, also referred to as user 9 in this specification. User 9 is connected to backbone 13 by Internet-access line 11, as was described with reference to FIG. 1. CPS 95 is optional in this example and not specifically required in order to practice the present invention. CPS 95 represents a collection server that is utilized for collecting and organizing user status-states, which may be subscribed to or otherwise accessed by agents of center 21.

FPS server 93 is adapted as a third-party server similar to those employed by well-known chat and instant messaging services. FPS 93 may be assumed to have software installed therein, and is adapted to organize instant communication between clients using a supported instant messaging service operating under a known protocol such as RFC2778 as was described in the example of FIG. 1. It is noted in this example, that CPS server 95 is connected to status server 49 within communication center 21 by high-speed data connection 20. A second high-speed data connection 19 is provided for connecting FPS server 93 to status server 49. In this respect, status server 49 has access capability to both CPS 95 and FPS 93. It is similarly noted herein, that high-speed data-access lines connecting server 49 to servers 95 and 93 are not required in order to practice the present invention. Server 49 may instead of adapted to connect to Internet backbone 13 using a 24×7 or a switched Internet connection.

In this embodiment, CPS 95 is hosted by center 21 and adapted to function in much the same way as FPS 93. That is to say that CPS 95 is a central facility for interaction. In one embodiment of the present invention, CPS 95 is not present and CPS SW 97 is instead distributed directly to client machines, as in this case, CPS SW 97 illustrated as installed in PC 9. It is noted herein that the functionality of CPS 10 of FIG. 1 is included in the enhanced version, or CPS SW 97 shown on PC 9. In the absence of server 95, with client machines enhanced by SW 97, CCPS 94 interacts directly with the customer.

User 9 may be assumed, in this example, to be accessing either FPS 93, or CPS 95 for the purpose of determining agent status information as described in FIG. 1 and for making status information available to subscribing agents.

IPR 25 handles incoming message events sourced from FPS 93 and/or CPS 95. Other than enhanced functionality represented by server 49 running CCPS 94 and dual connection capability from server 49 to CPS 95 and FPS 93, communication center 21 operates identically to the center (21) described in FIG. 1 including the configuration of agent's workstations and so on. Therefore, detailed re-description of the agent's operating environment (workstations, LAN connectivity, etc) need not be provided in this example.

In one embodiment of the present invention, PC 9 has a known instant-messaging software application installed therein and adapted to use FPS 93 as a centralized communication server. An example of one such messaging service would be the well-known ICQ™ service. In this case, CCPS 94 running on status server 49 is adapted to support the particular instant-messaging application employed by user 9 and supported at FPS 93. The instant-messaging application is, of course, assumed to be executing on the client machine, shown here as FPS-SW 97. For example, CCPS 94 may be adapted to recognize various descriptive states-of-activity represented at FPS 93 and associated with real-time communication states of connected users, in this case user 9. Examples of such states available through instant messaging services include indications of whether user 9 may be off-line or online. Other status indications such as "user is away" or "do not disturb" may also be included as standard status indications available with known messaging services.

CCPS 94 may be adapted to integrate an enhanced package of status indicators associated with communication-center use into software running on FPS 93 and on user station 9 such that user station 9 may communicate a variety of enhanced status messages to subscribing agents within communication center 21. It is also noted herein, that the functionality of agent-status indication as taught in FIGS. 1–3 above may be integrated into software at FPS 93 and at user station 9 without departing from the spirit and scope of the present invention. One example of an enhanced user-status indication that may be associated with communication center 21 may be an indication that user 9 is temporarily away and preferred contact is by cellular phone during this status period. Of course, the cellular phone number of user 9 would be provided as part of the indication. A communication-center agent, for example, an agent operating PC 43 within workstation 31 may subscribe to FPS 93 utilizing LAN 23, server 49, and high-speed data link 19.

In this case, the agent in question may be in various states of communication with a plurality of users connected to have FPS 93. According to a push model, user-status indications may be pushed in the form of periodic instant messages to PC 43, where they may be viewed by the monitoring agent. The monitoring agent may decide which callback options are appropriate based on user-status indication contained within the content of the instant message. That may be done by other protocol than just IM, e.g. HTTP, WAP, IPNT etc.

According to a pull case, the agent operating PC 43 may subscribe to an interface (not shown) served by FPS 93 such that current status indications are contained within the interface and viewable on PC 43. In this embodiment, status server 49 executing CCPS 94 provides interactive interfaces for both clients and agents for the purpose of viewing status. Also in this embodiment, status server 49 executing CCPS 94 may facilitate COST outbound dialing from agent to client through CSW 53 by virtue of connection 51.

An agent operating at one of connected workstations 27–31 may subscribe to real-time status reports associated with a plurality of users connected to FPS 93. Subscription may be defined as an active state of dialog established between an agent and the connected users. The dialog states may be initiated and established by users contacting agents through the method of the present invention. Therefore, users who have connected to FPS 93 and have initiated contact with an agent of communication center 21 may be considered for status reporting until the purpose of the dialog is achieved or the user is no longer connected to FPS 93.

In some cases, the agent user will not be a human agent but will be a special purpose server (not shown) providing some very specific services. One example of such a special server is a callback server that automatically initiates callback calls to a customer 9 based on that user's callback preferences and routes the call to an agent after the customer answers. Another example of such a special purpose server is a server that monitors the communication center's status and, on request of the customer 9, sends an alert to the customer when the communication center's status matches specific conditions, for instance when the average waiting time is smaller than three minutes.

In a preferred embodiment, there can be multiple FPS and CPS servers in network 92. There can for instance be one FPS 93 for every third-party presence service that is being used in the communication center. There can be for instance an FPS 93 that is able to obtain the cellular on-/off-line status of the customer's mobile (not shown).

In another embodiment, the customer can have multiple terminal devices such as a PC 9 and a cellular phone (not shown). For each type of terminal equipment there can be a different FPS 93 to obtain the on-/off-line status of the customer. By combining these partial statuses (SW not shown), for instance in CCPS 94, a complete customer status can be presented to the subscribing agent. In one aspect, the CCPS 94 can combine the presence information of the customer. In another aspect, the customer's PC 9 can combine the presence information. Take for instance the case where the PC is equipped with a modem-board and where the customer's telephony is also connected to that same modem-board. In this case, the client's PC 9 can combine the client's on-/off-line status for the customer's fixed line and for the customer's internet access and his ability to participate in a chat session or a net-meeting, etc.

In some cases the agent doesn't necessarily have to subscribe for agent status info to the CPS or FPS, the CCPS could take over this job (e.g. agent doesn't use IMPP to subscribe but proprietary protocol). In the latter case the CCPS could subscribe to the CPS or FPS. Generally, it is better to have a call center node subscribe to all different types of CPS and FPS nodes, because there is a need or preference, to combine the customer status information from those different nodes into one presentation for the agent. In some other cases, this CCPS functionality could run on a dedicated node, could be combined with other functionality on a separate node (e.g. embedding the status information in web-page), could run on the agents workstation (or node in case of automated agent), etc.

In another aspect of the present invention, CPS 95 executing CPS SW 97 functions as a status broker in much the same way as FPS 93. The exception being that CPS 95 is provided as a dedicated customer interface for the sole purpose of communication with communication center 21. In this aspect, the instant messaging application, SW 97, is proprietary and contains all of the status options and communications options supported by center 21 and does not have to be integrated with an existing instant messaging service. Provision of CPS 95 executing CPS SW 97 enables an agent operating one of workstations 27–31 within center 21 to subscribe to a single interface containing real-time or periodically updated status reports concerning all of the connected users which may be in dialog with the agent. In one embodiment, instant messages may be propagated in a push model as described above, instead of having subscription to an interactive interface.

Although in many cases the agent will not be communicating synchronously with the customer while receiving these customer's status info, it is possible to allow that, for example in cases where both the agent and the client need to do something, while communicating as well.

As previously described above, CPS 95 is optional and is intended to represent the central "place of status exchange" between agents and users, including but not limited to requests, etc. for dialog. According to another embodiment of the present invention CPS SW 97 is distributed directly to client PC stations similar to PC 9 as illustrated herein. In this case, status server 49 executing CCPS 94 functions as an instant message broker (i.e. proxy) between agents operating workstations 27–31 and users represented herein as user 9. In this case user 9 would log into a web server analogous to web server 15 of FIG. 1 for the purpose of initiating contact with communication center 21. Because and interfacing server is used to interface a plurality of users to communication center 21, both instant message type status reports and status reports contained with an electronic information pages (web pages) are possible.

In some cases, signaling may be sent over the IM protocol, although typically, the other media will provide their own protocol, which will be used respectively, such as H.323 or SIP for IPNT.

In still another embodiment, user 9 initiates direct contact to communication center 21 by virtue of a client-installed version of CPS SW 97, which would contain all of the appropriate contact mechanisms needed to effect IP-to-IP or IP-to-COST connections over the appropriate network paths to center 21. In this embodiment, server 49 executing CCPS 94 may still be used as an agent-interface server, to which agents operating stations 27–31 may subscribe to be in order to view current user status, including but not limited to IP-to-IP events. It is noted herein, that IP-to-COST events would arrive at communication center 21 after having been routed through PSTN 55 through an appropriate gateway. However, when such events arrive at CSW 53 for internal routing, a channel may be opened from server 49 to the node, which is in this case PC 9, from which the incoming event originated if the addressing information is included in the arriving COST event. In this scenario, an agent may interact with a user from a COST telephone and view that user's status information simultaneously. If for some reason the agent must terminate the call, the agent may still subscribe user's online status through the connection established to PC 9 by server 49. Even though there is no active communication between the contacted agent and the initiating user status regarding connectivity state, callback instructions, and so on is immediately available to the contacted agent. Similarly, agent availability and estimated time of response reports associated with the contacted agent are available to user 9 as long as the connection between user 9 and server 49 is open.

In another embodiment, the on-/off-line status information for user 9 will reach the communication center 21 independently from the callback preference information for that user 9. In one aspect, user 9 can be invited to fill out some form on a web page in order to specify callback preferences. In still another aspect, an agent can be feeding the customer preferences to the system during a communication with that customer 9. In these aspects, the callback preference information can be combined with the on-/off-line status information. In one aspect, the web page can be accessed by the customer using a PC. In another aspect, the web page can be accessed using a mobile device that is for instance WAP enabled. In one aspect, the web-page can be hosted by the FPS 93 or the CPS 95. In another aspect, it can be hosted by another server (not shown).

In still another embodiment, the customer's preferred third-party presence service can be part of the callback preferences. There are many third-party presence services such as, but not limited to, ICQ™ and MSN Messenger Service™. A user 9 that is a member of one these presence services, can allow agents of the communication center to monitor it's presence status by communicating it's preferred presence service to the communication center. In an aspect of the invention a customer that isn't a member of a third-party presence service can be allowed by the communication center to download the tools for a communication center specific presence service.

Figure 5:
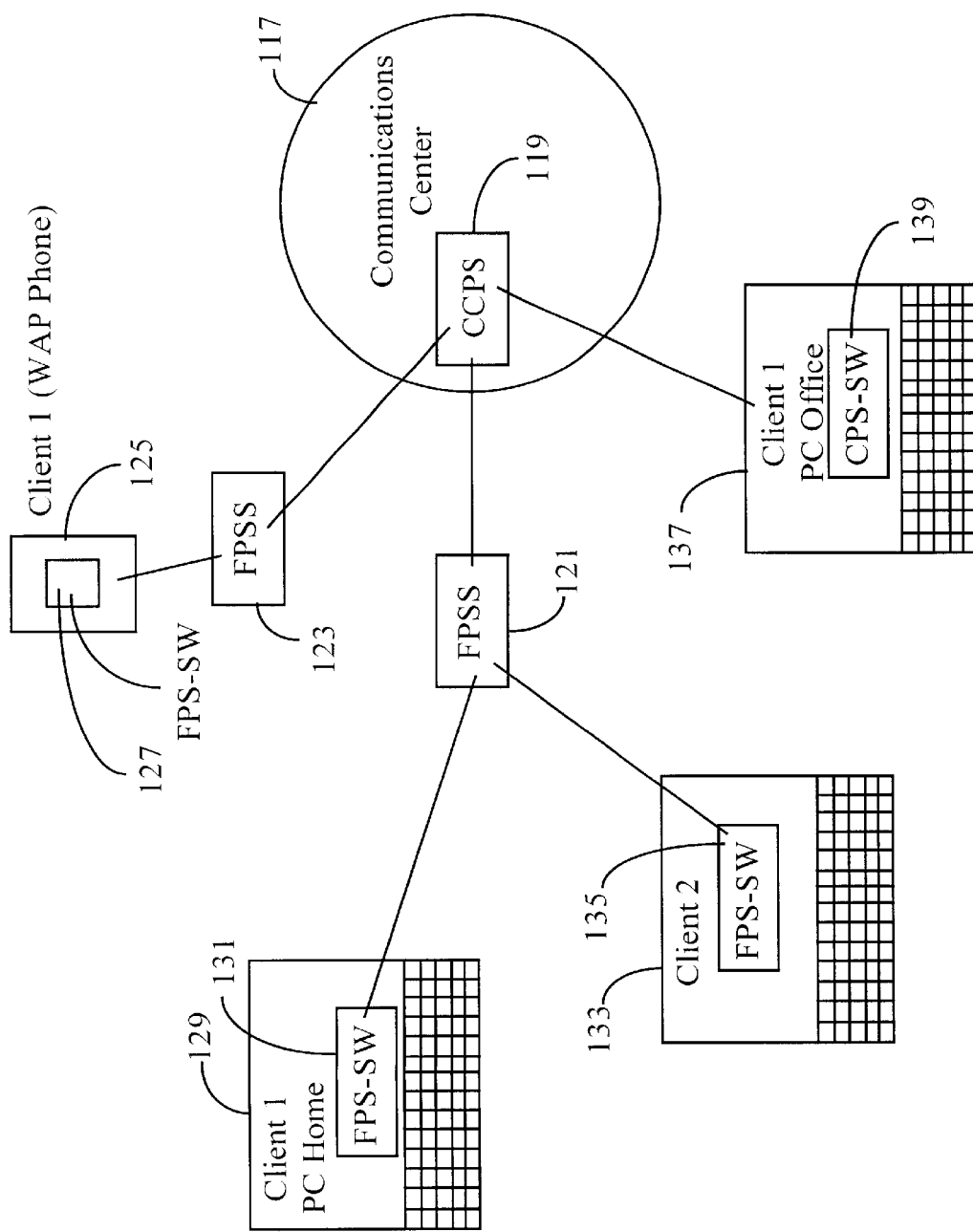
FIG. 5 is a plan view of exemplary agent-side media-interfaces 99 and 101 containing availability status and callback parameters according to an embodiment of the present invention.

FIG. 5 is a simplified logical connection diagram illustrating functionality of principally software elements in an embodiment of the present invention. In FIG. 5 CCPS 119 is illustrated as operable in a communication center 117 for receiving status from client devices and other information to be provided to agents. As described above, the agents may be live agents or robotic agents.

In FIG. 5 there are two clients (persons) labeled Client 1 and Client 2. There are four client devices 129, 133, 137, and 125, shown in FIG. 5. Client 1 has a PC 129 at his home, which executes an instance of FPS-SW 131, which is, in this case, AOL. Client 1 also has a PC 137 at his office executing an instance of CPS-SW 195. CPS-SW 139 is provided by the host of communication center 117. Further, Client 1 has a WAP telephone 125 executing an instance of FPS-SW 127, provided by Sprint in this example. Lastly there is a second client (Client 2) operating a PC 133, the PC executing an instance of FPS-SW 135, in this example also AOL.

A first Foreign Presence Service Server (FPSS) 121 monitors both instances of AOL (and any other instances at client premises not shown), and provides presence information to CCPS 119, which is enabled for AOL and is executing in communication center 117. A second FPSS 123 monitors WAP telephone 123. CCPS 119 monitors CPS-SW 139 executing on PC 137, although alternatively, there may be an intermediate Client Presence Service Server between PC 137 and CCPS 119, not shown here. Furthermore, in some cases additional servers maybe inserted as proxies etc. between for example FPSS 121,123 and CPSS 119 etc., not shown here.

It may be assumed, for example, that Client 1 in FIG. 5 may move between his PCs and carry his WAP telephone with him, being variously connected and available through the three client devices 125, 129, and 137. Real time monitoring of all of these devices by CCPS 119 directly and through FPSS instances provides valuable information to a real or robotic agent associated with Center 117, together with client preference information which may be achieved by any of several paths, as described above, in real time or according to pre-programmed preferences. The ability of agents, real or robotic, to respond to client's needs is therefore greatly enhanced. The skilled artisan will recognize that both FIG. 4 and FIG. 5 are greatly simplified illustrations, and there may be many more clients, client devices, and instances of FPS and CPS servers and software involved in many ways. The diagrams and accompanying descriptions are provided to convey the essentials of the invention and its functionality.

It will be apparent to one with skill in the art, that the method and apparatus of the present invention may be applied to a variety of connection scenarios without departing from the spirit and scope of the present invention. Similarly, the software of the present invention may be provided in a variety of functionalities ranging from an extendable application program interface (API) to an existing instant-messaging service to a fully functional server-driven service application including client-side and server-side components.

It will also be apparent to one with skill in the art, that instant messages following standard instant message protocol can be sent back and forth between subscribing agents and clients without departing from the spirit and scope the present invention. In addition to instant messaging, status alerts may take the form of pager messages or other types of known alerts when a client status is determined to be off-line.

Figure 6:
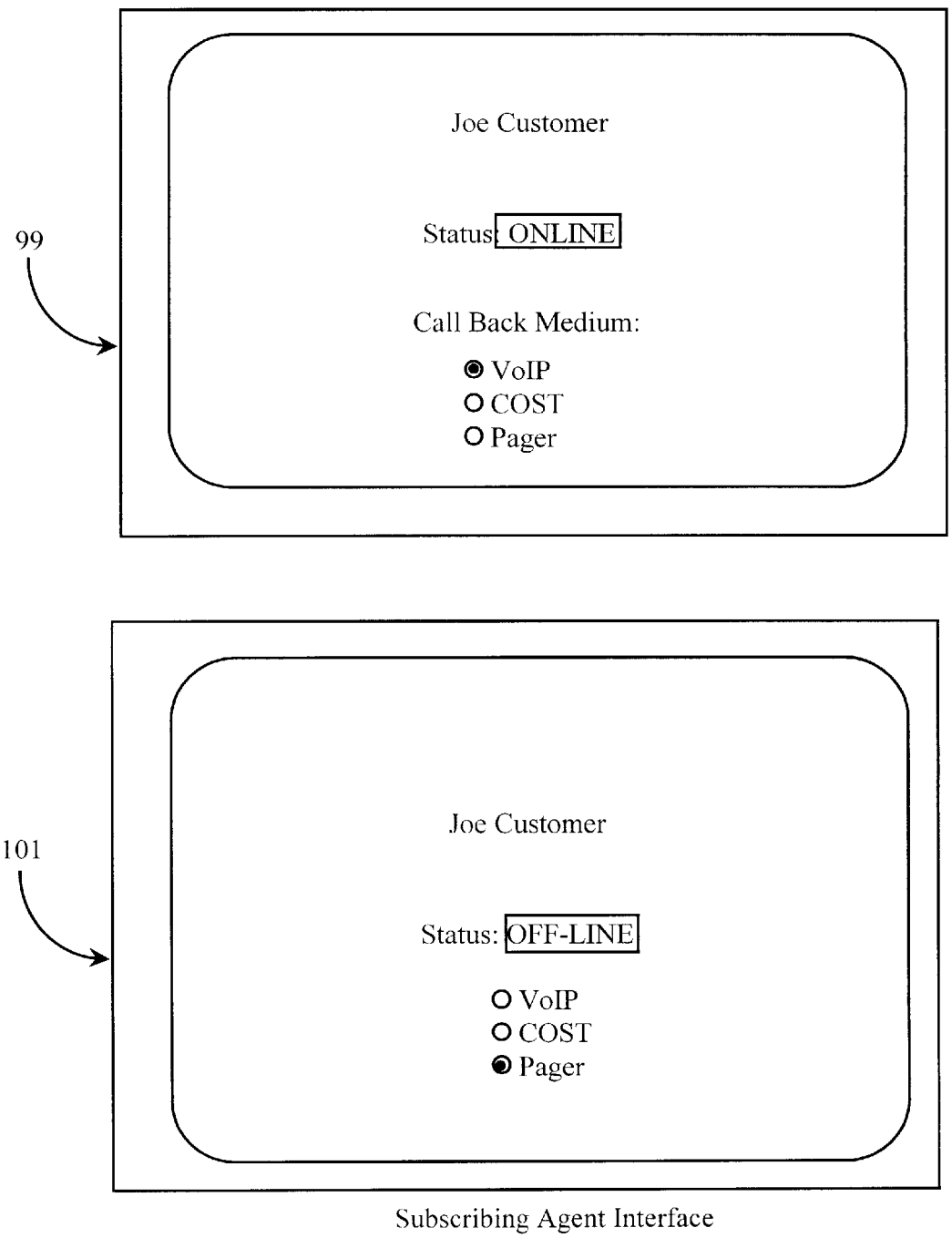
FIG. 6 is a flow diagram illustrating agent and system procedural steps for observing customer status and call back preferences according to an embodiment of the present invention.

FIG. 6 is a plan view of an exemplary agent-side media-interfaces 99 and 101 containing availability status and callback parameters according to an embodiment of the present invention. Interface 99 may take the form of instant message, a messaging window integrated into an electronic information page (web page), or any other graphics interface that may be propagated over network lines to subscribing devices. In this simple example, Joe Customer has a status of ONLINE and the requested callback medium of voice over Internet protocol (VoIP). Other callback mediums listed in interface 99 include a COST medium and a Pager medium.

In a one case, an agent subscribes to the status of Joe Customer during a dialog session typically initiated by Joe Customer. Interface 101 is analogous informed to interface 99 with the exception that the indicated status is OFFLINE. The status depicted in interface 101 is an indication to a subscribing agent that Joe is no longer connected to an interfacing server on the network. If Joe is connected to the network but no activity is recognized for a predetermined period of time, Joe's status may be determined to be AWAY. In this example, interface 101 depicts a pager medium as a preferred callback option.

In another case of the invention, a single agent may subscribe to a plurality of customer status messages simultaneously such that he or she may manage outbound calling in a more optimal fashion. Moreover, because the messaging is bi-directional Joe may receive alerts or messages indicating estimated waiting time for a callback, or perhaps instant message data that resolves the current dialog between Joe and an agent. In the latter case, instant messaging may be used to dispose of calls.

Figure 7:
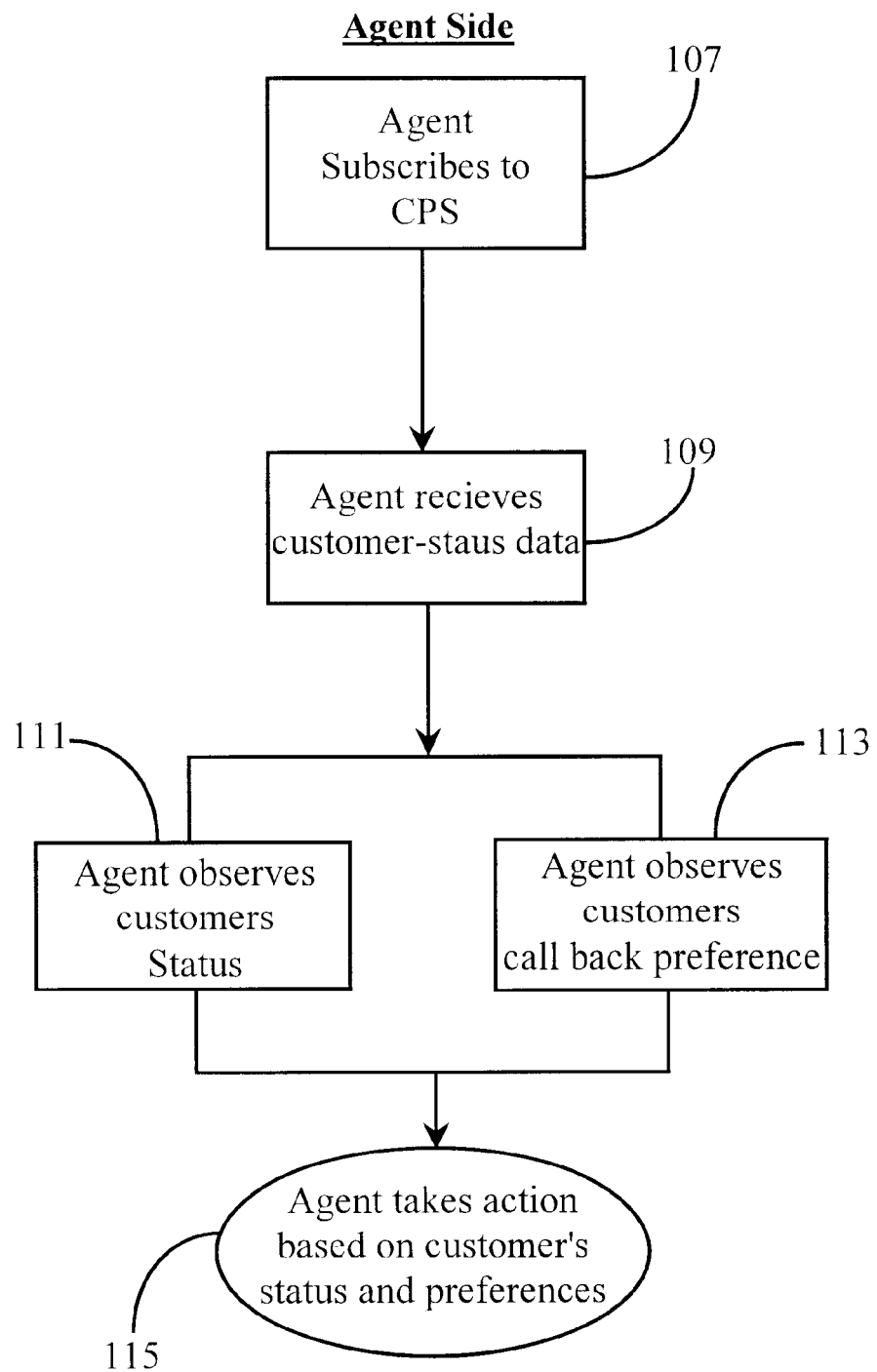
FIG. 7 is a flow diagram illustrating agent and system procedural steps for observing customer status and call back preferences according to an embodiment of the present invention.

FIG. 7 is a flow diagram illustrating agent and system procedural steps for observing customer status and call back preferences according to an embodiment of the present invention. At step 107, a communication-center agent subscribes to customer presence server 95 of FIG. 4, in this case, through status server 49 within communication center 21 described in FIG. 4. It is assumed in this step that the subscribing agent already has at least one customer who has initiated contact with the subscribing agent through server 95. It may be that the subscribing agent is working with a plurality of customers also connected to server 95.

At step 109, the subscribing agent is served one or more instant messages containing customer status information. In one embodiment, a single interface such as a web page containing status data categorized for each customer the agent is working with is served at step 109. In this case, status information related to each customer the agent is subscribing to may be contained in separate windows or lists available within interface. In another embodiment, the subscribing agent may select a customer and receive an instant message regarding that customer's status.

At step 111, the subscribing agent observes the customers' status relating to whether the customer it is online or off-line. At step 113, the subscribing agent observes the customer's call back preferences, which may very according to the customer's connection status. Call back preferences may include but are not limited to IP phone, cellular, e-mail, pager, COST telephone, interactive chat, and so on. At step 115, the subscribing agent takes action based on the customer's status and stated call back preferences.

In one case of the invention, CPS 95 may be facilitated as sort of a callback queue wherein a plurality of the agent's customers may be directed to if the agent of contact happened to be busy at the time of contact. During the period of waiting, customer status and call back preferences are propagated to the subscribing agent and estimated times of response and other information they be propagated to the waiting customers. Flexibility exists in this embodiment in that unlike any normal call-waiting queue, the customer is free to move about and even disconnect from the network and go about normal business while waiting for a callback.

In the case of a customer terminating his connection with server 95, the subscribing agent will be served an instant message reflecting the customer's off-line status and a medium wherein the agent may contact the customer off-line such as a COST telephone, a pager, or some other off-line medium.

In another case of the invention, a priority state may be applied to the plurality of customers waiting for a response from a particular agent. In this embodiment, the customers may subscribe to estimated-waiting time alerts regardless of whether they are online or off-line. For example, a customer may indicate that an alert be sent to his or her paging device approximately five minutes before an agent is estimated to respond by calling the customer on his or her cell phone the event that the customer has gone off-line from the interfacing server. The subscribing agent is served the off-line status, which includes the preferred call back medium and the appropriate cell phone number to call. The page alert to the customer they be propagated by the interfacing server if the server is equipped with outbound dialing capability into a telephony network. In this case the server has the communication-center status information of the agent including the estimated times for the agent to handle his or her calls in queue.

The method and apparatus of the present invention may be practiced over a communications network comprising any combination of Data-Packet, COST, and wireless networks utilizing appropriate gateways without departing from the spirit and scope of the present invention. Moreover, many variations of customer states and agent states may be included as options for configuration into the software the present invention. For example, a client may configure as many devices into the system as desired for enabling agent callbacks under a variety of circumstances. Similarly, an agent may subscribe singularly or in a plural sense to specific customer states.

In still another case of the invention, a central server such as CPS 95 of FIG. 4 may be dedicated to communication-center 21 such that all interfacing customers have status interfaces which are available to all subscribing agents. In this case, subscribing agent may browse and subscribe to selected customer states based on agent/customer match-up. For example, a subscribing agent specializing home loans for example, may log into the system and subscribe to any customers connected the system who have initiated an inquiry to communication center 21 regarding loans. There are many variant possibilities.

Personal Interaction Client-Center Interface

According to another aspect of the present invention, a personalized client-center interface is provided, which in addition to accommodating the agent/client presence services described above, provides an interactive capability to clients for the purpose of enabling the client to perform a number of communication-center related tasks without involving agent interaction. In one embodiment, for example, the client is enabled to access information at the communication center, and to check thereby the status of a transaction. In this and other embodiments a client can access a variety of other information, and interact with communication center capabilities in a number of ways. The method and apparatus of the present invention is enabled in various embodiments by the teachings presented below.

Figure 8:
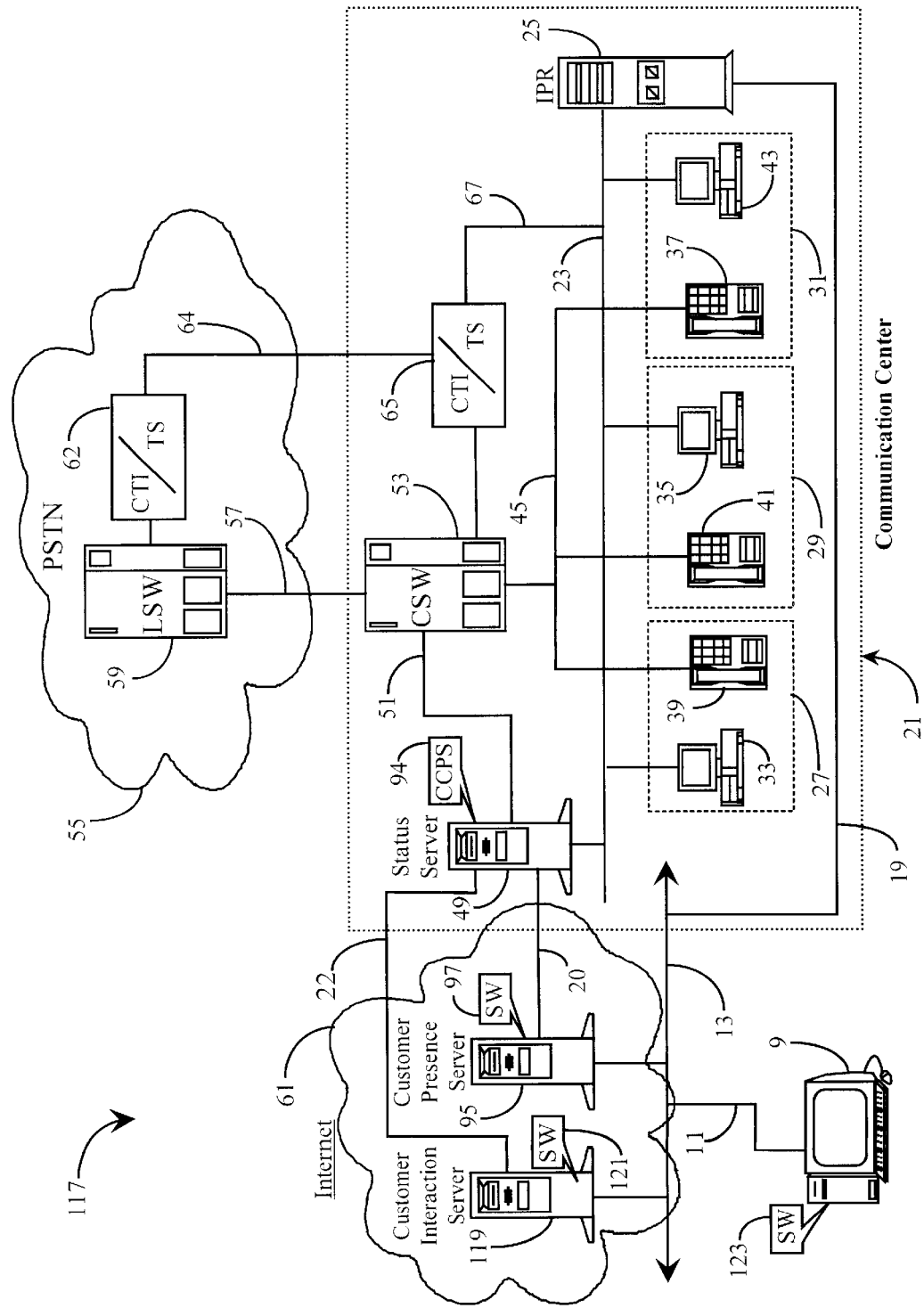
FIG. 8 is an overview of a communications network wherein a personal interaction-center system is utilized according to an embodiment of the present invention.

FIG. 8 is an overview of a communications network 177 wherein a personal interaction-center system is utilized according to an embodiment of the present invention. Communications network 117 is somewhat analogous to communications network 92 of FIG. 4 above in terms of basic architecture and software implementation. Elements of network 92 which are not modified for the purpose of enabling the present invention are not re-introduced with new element numbers. Communications network 117 comprises PSTN 55, DPN 61, communication center 21, and an exemplary user 9 as described above with reference to network 92 of FIG. 4.

PSTN 55, as described in the example of FIG. 4, represents a preferred network connecting all COST clients who call into communication center 21 for the purpose of doing business with the center. PSTN 55 is connected to the communication center 21 through COST telephony trunk 57 and data network 64.

In this example there are 2 exemplary file servers illustrated as connected to Internet backbone 13. These are a customer presence server (CPS) 95 and a customer interaction server (CIS) 119. It is noted herein that CPS 95 is identical with CPS 95 described in FIG. 4, and can be assumed to provide the formerly described functionality of server 95 and associated web presence server software 97 of the same example. CPS server 95 is, in this example, hosted by the same entity hosting communication center 21 and is utilized as an agent/customer interface.

CIS 119 is provided as a single example of a way in which the functionality of the present invention may be implemented. There are a number of other ways within the spirit and scope of the invention that this may be done, such as by utilizing the functions described above provided by WS 15 of FIG. 1 with those of FPS 93 of FIG. 4. The overall functionality may also be provided by utilizing the functions of WS 15 with those of CPS 95. Further, there is no implication here that the user interface, in the case of a Web page, by hosted by a third party. The descriptions of the functions of CIS 119 in great detail in the following material is to be construed in this light, that there needs be an interface, and that described is exemplary, and that the functions may be provided differently within the spirit and scope of the invention.

CPS SW 97 is enhanced for the purpose of allowing an agent to subscribe to real-time customer availability information as it applies to the remote station occupied by the customer. In this case, the station refers to remote PC 9, also referred to as user 9 in this specification. User 9 is connected to the Internet backbone 13 by access line 11, as was described with reference to FIG. 4. CPS 95 represents a collection server that is utilized for collecting and organizing client status information, which may be subscribed to or otherwise accessed by agents of communication center 21. CPS 95 is optional in this example and not specifically required in order to practice the present invention as will be described below.

It is noted in this example, that CPS server 95 is connected to status server 49 within communications center 21 by high-speed data connection 20. A second high-speed data connection 22 is provided for connecting CIS server 119 to status server 49. In this respect, status server 49 has identical high-speed access capability to both CPS 95 and CIS 119. It is similarly noted herein, that high-speed data-access lines connecting server 49 to servers 95 and 119 are not required in order to practice the present invention. Server 49 may instead be adapted to connect to Internet backbone 13 using such as a switched Internet connection.

In this embodiment, CPS 95, enhanced by CPS SW 97, is hosted by communication center 21 and adapted to function in much the same manner as CIS 119. That is to say that CPS 95 is a central facility for interaction. Agents 27, 29 and 31 may be assumed, in this example, to be accessing either CIS 119, or CPS 95 for the purpose of determining client status information and for making status information available to servicing agents.

IPR 25 handles incoming message events sourced from CIS 119 and/or CPS 95. Other than enhanced functionality represented by server 49 running CCPS 94 and dual connection capability from server 49 to CPS 95 and CIS 119, communication center 21 operates identically to the center (21) described in FIG. 4 including the configuration of agent's workstations and so on. Therefore, detailed re-description of the agent's operating environment (workstations, LAN connectivity, etc.) will not be provided in this example.

Agents 27, 29 and 31 may be assumed, in this example, to access either CIS 119, or CPS 95 for the purpose of determining client status information in a similar manner as that described in FIG. 4 above so that the information can be used for optimizing call-back scenarios. It is again noted that in the absence of CPS 95, its function may be assumed to be provided to server 119.

IPR 25 handles incoming message events sourced from CIS 119 and/or CPS 95. Other than enhanced functionality represented by server 49 running CCPS 94 and dual connection capability from server 49 to CPS 95 and CIS 119, communication center 21 operates identically to the center (21) described in FIG. 4 including the configuration of agent's workstations and so on. Therefore, detailed re-description of agent's operating environment (workstations, LAN connectivity, etc.) will not be provided in this example.

A distributed software application is provided to reside in one part on server 119 as software (SW) 121 and in one part as software (123) residing at remote station 9. SW 121 is adapted to enable a user operating station 9 through SW 123 to subscribe to a personalized and interactive activity interface (SW 121). It is noted herein that while not required, SW 121 may incorporate the presence reporting capabilities taught in the examples of FIG. 4 (SW 97) and of the example of FIG. 1 (WPS 16). The inventor intends that the three capabilities taught, customer presence reporting, agent presence reporting, and personalized client interaction capabilities may be combined, if desired, into a single distributed software implementation namely SW 121 and SW 123. However, one with skill in the art will recognize that each capability taught may be separately implemented by both hardware and software provisions.

In one embodiment of the present invention, SW 123 residing on PC 9 is known instant-messaging software adapted to enable client connection to CIS 119 as a centralized communication server. An example of one such known messaging service would be the well-known ICQ™ service. In this case, CCPS 94 running on status server 49 would be adapted to support the particular instant-messaging application employed by user 9 and supported at CIS 119 by SW 121. In this case server 119 may be hosted by the entity hosting general IM services and through special arrangement, may provide personalized interfaces enabling client interaction to common clients of center 21 and the entity hosting server 119.

In a preferred embodiment, SW 121 provides interactive activity interfaces of the form of dynamic WEB pages complete with instant messaging capabilities. In this embodiment, SW 123 at station 9 represents a thin client application that may operate in a stand-alone fashion or be plugged into a client's browser application.

In another embodiment, server 119 is hosted by the same entity that hosts center 21. In this regard, SW instances 121 and 123 are dedicated applications enabling client interaction capability with various communication-center resources.

CCPS 94 running on status server 94 is adapted to handle brokering of all of the targeted resource information from center 21 as well as all of the client presence data from a plurality of clients. For example, CCPS 94 is adapted to integrate and distribute to SW 121 an enhanced package of client-accessible and researchable data resources associated with communication-center activity as it pertains to a requesting client in a personalized manner. Such data, incorporated into a dynamic interface by virtue of SW 121 running on CIS 119, is accessible to clients operating SW 123, in this case, running on user station 9. In addition to providing interactive access to communication-center resources, instant messaging may be employed such that agents 27, 29 and 31 may be able to communicate a variety of enhanced status messages to communicating clients being served by communication center 21. It is also noted herein, that the functionality of agent-status indication as taught above with reference to FIGS. 1–3, may be integrated into software at CIS 119 and accessible from user station 9 without departing from the spirit and scope of the present invention. A communication-center agent, for example, an agent operating PC 43 within workstation 31 may subscribe to CIS 119 utilizing LAN 23, server 49, and high-speed data link 22 for the purpose of determining client presence, as well as for assisting a client with interactive tasks, if required.

In a preferred implementation of the present invention, a client (9) can verify a current interaction status between himself or herself and communication center 21 without initiating a call to the center. Center 21 can also verify the status of client 9 without initiating a callback. The further goal of this specification is to enable client 9 to perform a variety of center-related tasks, which may be performed without agent involvement. Such tasks may include, but are not limited to, checking current status of an order-in-progress, reviewing interaction history regarding events leading to an order-in-progress, modifying or canceling orders-in-progress, researching available product data, initiating contact with entities of center 21, subscribing to personalized notices of events including special sales and promotions, changing personal contact and status information, requesting a callback from the communication center specifying a specific medium and specifying a specific time, initiating a communication with the communication center and so on.

In one embodiment, client interaction at CIS 119 is open such that any subscribing agent in question may monitor states of activity of a plurality of users actively connected to CIS 119. According to a push model, user-status indications may be pushed in the form of periodic instant messages to, for example, PC 43, where they may be, for example, viewed by a monitoring agent working station 31. In this case, a monitoring agent may decide whether or not to become actively involved in interaction with a client. For example, if a client is reviewing interaction history regarding a particular product of interest handled by a monitoring agent, that agent may invite the client to a pre-scheduled chat session about the product, or perhaps an impromptu chat, which may lead to an additional sale. There are many possibilities when one considers full instant messaging and chat capability.

According to one embodiment, an agent operating PC 43 may subscribe to an interface (not shown) served by CIS 119 such that current status indications are contained within the interface and viewable on PC 43. In this embodiment, status server 49 executing CIS 119 provides interactive interfaces for both clients and agents for the purpose of viewing status and as a predecessor to impending dialogue. Also in this embodiment, status server 49 executing CCPS 94 may facilitate COST outbound dialing from agent to client through CSW 53 by virtue of connection 51.

An agent operating one of the connected workstations 27, 29 or 31 may subscribe real-time status reports associated with a plurality of users connected to CIS 119 as previously described. Subscription may be defined as an active or in-active state of dialog established between an agent and the connected users. The dialog states may be initiated and established by users contacting agents through the method of the present invention or by agents contacting users.

Although the present specification teaches a personalized interaction capability whereby clients may interact with various communication-center hosted resources, it will be clear to one with skill in the art that bi-directional status reporting as taught in the cross-referenced specifications, disclosure of which is encompassed by description of FIGS. 1–6, may also be provided through the same interface. An example of such an enhanced interface is presented below.

Figure 9:
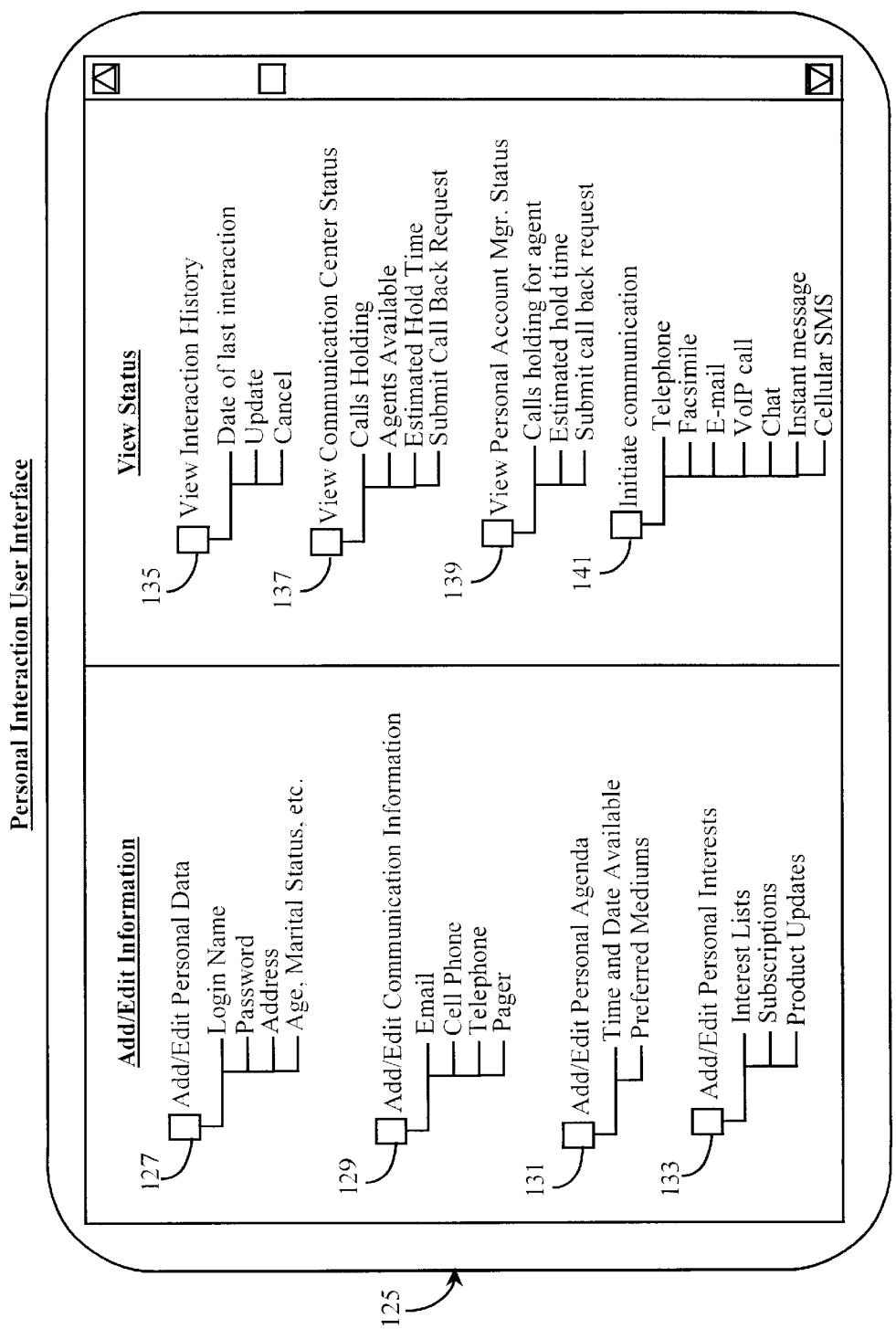
FIG. 9 is a plan view of an interactive user interface served by CIS 119 of FIG. 7 according to an embodiment of the present invention.

FIG. 9 is a plan view of an interactive user interface 125 served by CIS 119 of FIG. 8 according to an embodiment of the present invention. In this example, the Personal Interaction User Interface (PIUI) 125 is composed of two sub-elements or sections. These are a section labeled Add/Edit Information and a section labeled View Status. In this embodiment, the Add/Edit Information element is made up of four basic categories of data used to create a dynamic multifaceted profile of a client that is accessible to communication center entities. These four categories represent interactive add/edit functions illustrated in this example, by an element number 127 (critical account and personal data), an element number 129 (network-capable appliance communication information), an element number 131 (personal agenda information), and an element number 133 (personal interests data). The information described in sub-element 133 lends itself to life style and preferences of a client and therefore is established in a manner as to be updated as often as is necessary.

The section of interface 125 labeled View Status comprises two basic categories. These categories are illustrated herein by element number 135 (view interaction history) and element 137 (view communication center status). The information described in category 135 relates to current and past interaction history between a client operating interface 125 and entities of a communication center. Entities as defined herein may also be assumed to include automated systems. The information described in category 137 relates to status information made available by the center upon request and, in some cases, dependant on the nature of the request.

In addition to the above, element 139 is for viewing the status of individual agents as personal account managers, allowing a user to monitor calls holding for the agent, estimated hold time, and to submit a call-back request. Element 141 allows the user to initiate a communication in any one of a variety of formats, as indicated. As can be seen in this example, interface 125 covers all of the functionality described in the embodiments 20 introduced by FIGS. 1 and 4 above.

In a preferred embodiment of the present invention, every client subscribing to the system of the present invention is provided with at least an identification parameter (member ID number). In this way, data obtained and stored from internal and external sources is easily identifiable to a particular client. In addition, passwords and log-in requirements may be instituted depending on enterprise rules. Much profile information about clients may be automatically compiled using on-going historical data resulting from ongoing relationships with clients. Such data, if available, may automatically appear in the described Add/Edit Information section of interface 125 when first created. It is important to note herein that the data categories 127, 129, 131, and 133 may be populated using automatic interaction recording methods during communication center interaction events.

Referring now to personal data category 127, this information is illustrated herein as divided into various basic subcategories. These subcategories are listed from top to bottom as: login name, password, address, and age, marital status, etc. Each category may be further divided into more subcategories as deemed appropriate. As data is automatically compiled about a client over time, the client's profile becomes more and more accurate. Interface 125 enables a client to manually add or edit information at any time.

Element 129 provides information relating to the network-capable appliance capabilities of the client. This element is divided into various subcategories befitting the status of the client. In this example, the subcategories are Email, cell phone, telephone, and pager. This element may be edited continuously in keeping with the changing requirements of the client. Additional communication capabilities may include but are not limited to IP phone, PC applications such as specific chat interfaces, file-share programs, and so on.

Element 131 reflects personal agenda information provided by a client and is divided into various subcategories that pertain to the client's personal preferences relative to time and date available for communicating with agents at the communication center and preferred method or methods of communication. Personal agenda information may be edited frequently as a client's personal state changes.

Element 133 pertains to personal interests of a client and is divided into multiple subcategories. In this example, the subcategories listed include interest lists, subscriptions, and product updates. Category 133 is, in this example, a vehicle through which a client may communicate general desires to agents of a communication center. For example, interest lists may detail all of a client's particular interests whether related to communication-center business or not. By knowing interests of a client, agents may be better able to relate to the client on a personal level. Moreover, interests may be taken into consideration when serving the client. Subscriptions may include client subscriptions to communication-center provided material as well as to materials provided by other sources. Product updates may include requests to add notifications of when new or newly enhanced products offered by the communication center are available. Frequent client editing and addition of new data through category 133 is expected.

In the View Status section of interface 125, element 135 enables client access to personal interaction history as previously described. Subcategories of category 135 represented herein include a date of last interaction, an update option, and a cancel option. Information accessed through interaction within category 135 is compiled over time and is personalized to the client. Such available history data may include separate interaction records pertinent to separate communication mediums. Interaction records may be further divided by product, agent interacted with, and so on. Moreover, interaction with automated systems of a communication center may be included. In one embodiment, a client may be provided with various options for ordering interaction history records. For example, a client may order a combined record including all communication-center interaction presented according to data and time. In another embodiment, partial records may be ordered through a search function (not shown) provided in interface 125. There are many possibilities.

Element 137 pertains to communication center status reflecting information pertinent to a client when desiring contact with an entity of a communication center. It is noted here that a client may access and view agent status without initiating a contact event. However, in some embodiments, a client may submit an instant message summarizing an intent of a pending communication event whether it will be initiated by a client or by an agent calling the requesting client. Subcategories represented herein include calls holding, agents available, estimated hold time, and submit call back request. These and various other available options provide information for the client relative to the status of the communication center, and availability of services before connecting to the communication center or requesting a contact event from the center.

It will be apparent to one with skill in the art, that there may be more categories and subcategories described in interface 125 without departing from the spirit and scope of the present invention. The inventor has outlined basic categories and basic subcategories and deems them sufficient for illustrative purposes. Furthermore, as an interactive interface, it may be assumed that appropriate secondary interfaces will display for clients interacting with interface 125 such that selective viewing, data entry, editing, and so on may be accomplished. Such secondary interfaces may be linked to each category and subcategory through hyper linking or other known methods.

It will be apparent to one with skill in the art, that the method and apparatus of the present invention may be applied to a variety of connection scenarios without departing from the spirit and scope of the present invention. Similarly, the software of the present invention may be provided in a variety of functionalities ranging from an extendable application program interface (API) to an existing instant-messaging service to a fully functional server-driven service application including client-side and server-side components.

It will also be apparent to one with skill in the art, that instant messages, following standard instant message protocol, can be propagated back and forth between subscribing agents and clients without departing from the spirit and scope of the present invention. In addition to instant messaging, status alerts may take the form of pager messages or other types of known alerts when a client status is determined to be off-line. In addition, multiple protocols may be used, including IMPP, HTTP, WAP, and other known protocols, either alone or in combination.

Communication-Center Management Using IMPP

According to another aspect of the present invention, IMPP is used within a communication center for state management and other typical and a-typical center functions. The method and apparatus of the invention is detailed below.

Figure 10:
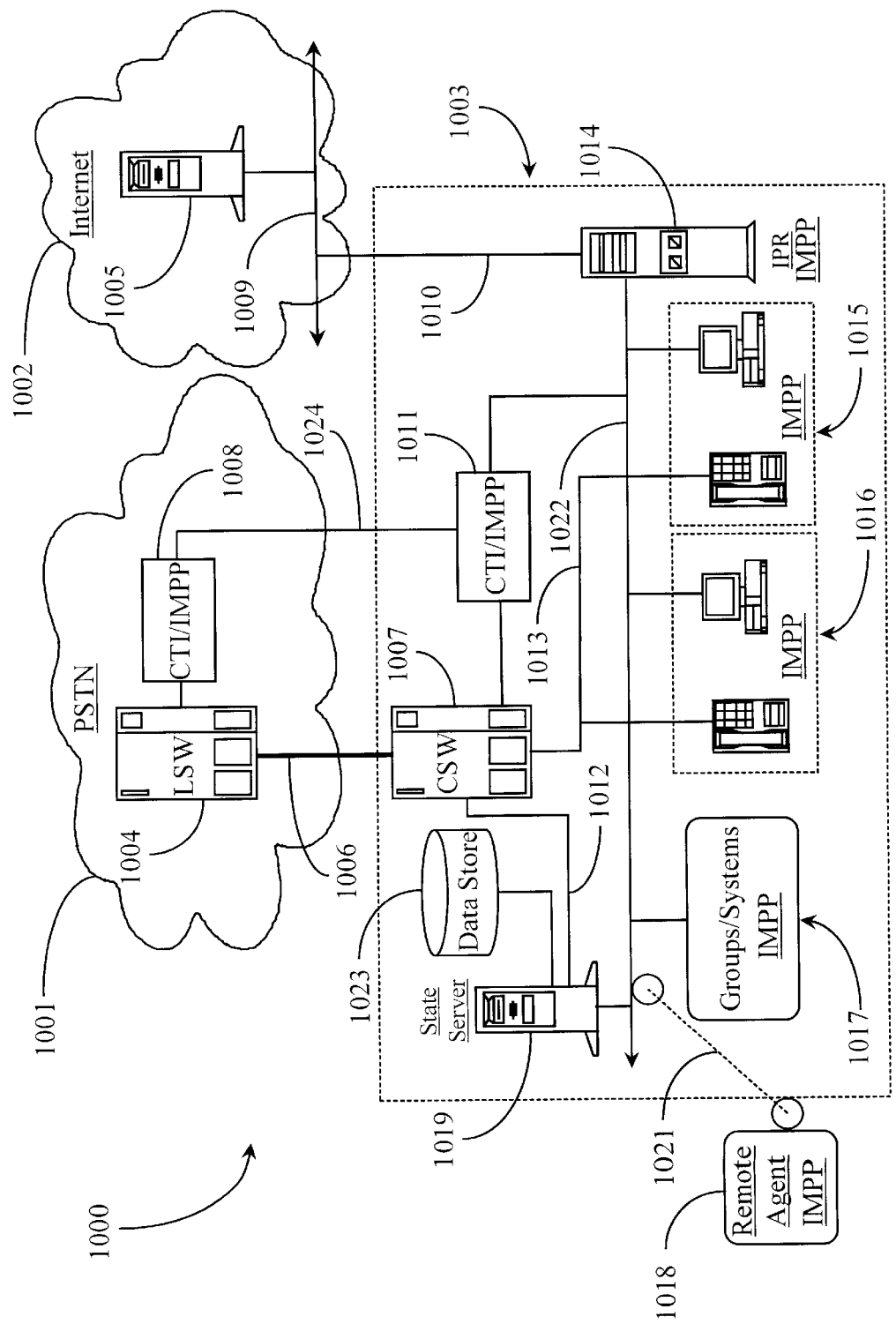
FIG. 10 is an architectural overview of a communication center enhanced with an IMP protocol according to an embodiment of the invention.

FIG. 10 is an architectural overview of a communication center 1003 enhanced with presence detection and reporting according to an embodiment of the invention. Communication center 1003 represents a state-of-art center operating according to dual capabilities of processing COST communication events and multimedia IPNT communication events. In one embodiment however, center 1003 may be a pure IPNT capable center. In this example, center 1003 is part of a preferred communications network 1000 that includes a COST network 1001 and a digital network 1002 through which clients of the center 1003 gain access to offered services of the center.

Center 1003 may be assumed to have all of the presence capabilities described with reference to center 21 of FIG. 8. That is to say that clients may monitor presence information of entities including agents within center 1003 and agents may monitor presence information about clients accessing the center enabled by the equipment and software illustrated in that example.

COST network 1001 may be any type of telephony network as known in the art. In a preferred embodiment, a PSTN network is illustrated because of its high public use characteristics. Network 1001 will hereinafter be referred to as PSTN 1001. Digital network 1002 may be any type of data-packet-network known in the art such as a private WAN, corporate WAN or public WAN. In a preferred embodiment, digital network 1002 is the well-known Internet network and will be referred to hereinafter as Internet 1002.

A local telephony switch (LSW) 1004 is illustrated within PSTN 1001 and represents a telephony switch local in the network to center 1003. LSW 1004 represents a last routing point in PSTN 1001 for COST communication events destined for routing to center 1003. In this embodiment, LSW 1004 is CTI enabled by virtue of a connected processor 1008 running CTI telephony software and an instance of Instant Message and Presence Protocol (IMPP). Processor 1008 may also contain software for voice interaction with customers (IVR software) as well as routing software proprietary to center 1003.

LSW 1004 has connection to a telephony switch 1007 illustrated within center 1003 by virtue of a telephony trunk or trunks 1006. Switch 1007 is referred to herein as a central switch (CSW) of center 1003 and will hereinafter be referred to as CSW 1007. CSW 1007 represents a final routing point within center 1003 for incoming COST events from PSTN 1001 before internal routing to an agent or system for call resolution. CSW 1007 is CTI enabled by virtue of a connected processor 1011 running an instance of CTI telephony software and an instance of IMPP. Processor 1011 may also have additional software conventions as mentioned in the description of processor 1008 above.

Processors 1008 within PSTN 1001 and 1011 within center 1003 are connected for data communication by a data network link 1024. In this way certain routing rules and protocols, including IMPP may be extended from center 1003 into the level of the PSTN network wherein selected telephony switches may be controlled in terms of interaction with clients attempting to reach center 1003 as well as event handling of those interactions. Thus, data about calls and call originators pertinent to calls waiting for transfer from switch 1004 to switch 1007 can be passed ahead to center 1003, in many cases to the final routing point or destination of the call for preview before the actual event arrives.

Internet 1002 has a backbone 1009 illustrated therein and extending geographically there through. Backbone 1009 represents all of the lines, equipment, and connection points making up the Internet network as a whole. A network server 1005 is illustrated within Internet 1002 and is connected to backbone 1009. Server 1005 is adapted to serve electronic information pages, in the case of the Internet, Web pages in HTML and other types of suitable and known markup languages applicable to a variety of Internet access devices (client devices not shown). Server 1005 represents an access server maintained on Internet 1002 and hosted by center 1003.

Clients operating Internet capable devices may access center 1003 through server 1005 and an Internet access line 1010 set up between an illustrated Internet protocol router (IPR) 1014, maintained within center 1003 and sever 1005. IPR 1014 is adapted as a data routing server and routes events including all types of multimedia sessions to appropriate agents and systems working within center 1003. IPR 1014 is IMPP-enabled as suggested by label.

Communication center 1003 has a local area network (LAN) 1022 provided therein for center system and member (agent) connectivity requirements. LAN 1022 may be assumed to be adapted with all of the appropriate protocols supported within Internet 1002 including TCP/IP and so on. LAN 1022 is directly connected to IPR 1014 and serves as a routing conduit for data events routed to systems or agents from router 1014.

Agents are represented in this example by illustrated agent workstations 1015 and 1016. Each workstation 1015 and 1016 contains, at minimum, a LAN-connected PC and a COST telephone (illustrated by appropriate icons within each station). Telephones in each station 1015 and 1016 are connected to CSW 1007 by way of internal COST telephony wiring 1013. PCs illustrated within station 1015 and 1016 are LAN connected. In this example, agents take COST calls using a typical telephone and IPNT events are LAN-delivered to agent PCs. Digital data associated with COST events is LAN-delivered to agent PCs ahead of ringing events.

In another center station architecture known to the inventor, IP telephones replace COST telephones and all COST events are converted to data-packet-events before final routing to agents. In this case the IP phones are LAN-connected, or PC connected through soundcard installation procedures known to the inventor. Illustration of both COST and IPMNT capability with respect to center 1003 is for discussion purposes to more clearly describe the invention.

Each agent station 1015 and 1016 is enabled to support IMPP protocol. This may be accomplished in a conventional sense through known software applications or through proprietary presence applications. IMPP applications within stations 1015 and 1016 are accessible through interface using PC monitor and keyboard function as is well-known in the art.

Processor 1011 has a direct LAN connection and may be accessed and programmed or updated through LAN networking. Agent groups operating in concert with each other or one or more systems (automata) can be configured for LAN connection as destination points for both COST and IPNT-type access initiated by clients or other internal communication center entities whether human or machine. Such a group or system implementation is illustrated herein by a LAN-connected block 1017 labeled Groups/Systems. Groups/Systems 1017 is IMPP enabled similarly to other previously described communication center entities.

A state server 1019 is provided within center 1003 and connected to LAN 1022. Server 1019 is IMPP-enabled and is adapted to serve current data regarding resources of the center and for synchronizing data with various systems. A data store 1023 is illustrated as connected to server 1019. Data store 1023 stores resolute information about agents and/or systems operating within center 1003. The information is presence-reportable information including particular state information blocks associated with database tuples with resolution down to real-time status snippets of agents and systems as may be affected by ongoing center activity.

In this example, a remote agent 1018 is illustrated outside of immediate center domain such as outside of an assigned workstation, but has a wireless connection 1021 to LAN 1022 that enables limited database access and therefore limited skill availabilities that would otherwise be available. Agent 1018 is IMPP-enabled and may be operating a cellular telephone, a personal digital assistant (PDA) or another network-capable device.

In practice of the invention, agents, systems, and groups can spawn generation of presence information models specific to targeted entities. The information is updated and stored as database tuples and state information blocks related to availability states of database supported skills and accessible media types that may be affected by activity states of an agent or system within center 1003 or external from the center but connected to the center network through a remote device. In a preferred embodiment the method of the present invention includes access to tuples and their current states for agents seeking information about other agents, clients seeking information about agents, clients or agents seeking information about systems, systems seeking information about clients, and systems seeking information about other systems. Information sharing between the just-described entities is accomplished using instant message and presence protocol. Some calibration is required if known IMPPs are employed in order to tune the protocol to the schema used to organize database tuples and their various possible states. In another embodiment, a proprietary protocol can be provided that is constructed around the parameters of database architecture and center activity protocols.

Figure 11:
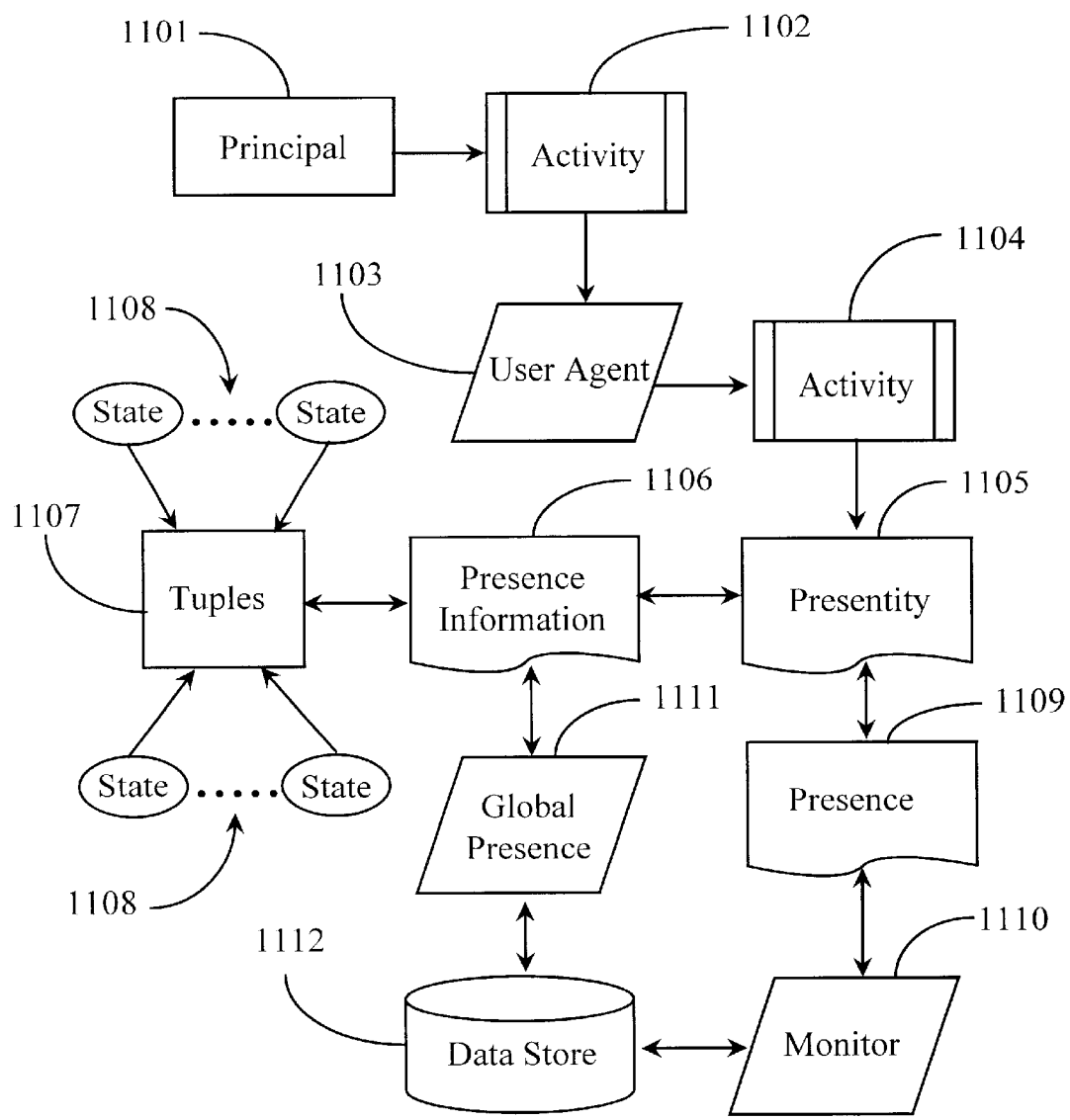
FIG. 11 is a block diagram illustrating function between software and hardware components of the system of the invention.

FIG. 11 is a block diagram illustrating function between software and hardware components of the system of the invention. In a preferred application of the invention, a principle 1101 is presented herein as terminology equated by the inventor to a requesting user. Principle 1101 may be a single user such as an agent, client or single machine (system) or application. In another embodiment, principle 1101 represents a group of agents or more than one system, application or perhaps a client group.

When principle 1101 needs to obtain current information about another entity or principle within the system it initiates an activity 1102 that spawns a software agent 1103. Software agent 1103, also termed user agent, is a software gopher that has access through various links to system information and can return that information to principle 1101.

User agent 1103 initiates a request/response activity 1104 to whatever target principle 1101 it is seeking information about. For example if principle 1101 is an agent of the center and he or she is seeking redirection information about a second target agent in the system then user agent 1103 will endeavor to obtain and return that information. A software form termed a presentity by the inventor and given the element number 1105 is spawned through activity 1104 initiated by agent 1103. Activity 1104 may be a targeted request/response activity. In some cases activity 1104 includes a search function that locates a target principle and confirms an up state of the entity within the system before requesting information.

Presentity 1105 has many aspects to it. In a preferred embodiment presentity 1105 is a generic form or model and is unique to a particular center entity only after it is populated with data. Presentity 1105 may be thought of logically as a picture or object model of a presence data report about a center entity. For example, presentity 1105 owns a presence 1109, which is a confirmation of the existence of an active presence summary associated with a principle. If the principle in question is not operational or logged into the communication center system, then presence 1109 would inform of unavailability status or (not currently logged in).

Presentity 1105 also owns all of the current information illustrated herein as presence information 1106 associated with presence 1109. Presence information 1106 has all of the appropriate presence tuples (database blocks) 1107 that are current for any given period of time of access and reporting of the information.

Individual tuples 1107 each have one or more state data blocks 1108 associated therewith that are data snippets that help completely describe the current state of any given tuple of presence information. State blocks 1108 may be thought of as properties associated with individual tuples 1107. Aggregation and construction of all of state blocks 1108 and tuples 1107 complete a presence information model represented as presence information 1106. Therefore, any change in state information of a tuple changes the tuple, which in turn changes the presence information model 1106 of presentity 1105. IMPP is used in this example as the messaging protocol for data synchronization required to provide most recent real-time snapshots of presence information 1106.

Presentity 1105 as a form is continually updated in real time by data synchronization as described above. IMPP synchronization is performed by a monitor 1110 and/or by a global presence entity 1111 between a provided data store 1112 with server capability and presentity 1109.

In one embodiment, as principles log into the communication center system of the invention, their current states are first reported and stored in data store 1112. After initial login, a given principle's activity and therefore availability states will begin to change and evolve over time. For example, if a principle is an agent working in the center, he or she may begin the day by answering e-mails. Therefore the principle's activity states reflected by presence information 1106 may show that the principle is currently unavailable for COST communication, is available for IPNT communication including e-mail, and has full access to customer information systems, multimedia, etc. Therefore, the skills of the principle are fully enabled except for COST communication.

In the above-case scenario IMPP reporting mechanisms at the agent's workstation can be activated to report state changes as they occur changing presence information model 1106. Such reporting mechanisms can be aggregated in an IMPP display set tip on the desktop computer and may report as events occur (event driven) or may be monitored for change based on a pre-determined periodic interval. In such a display, all of the agent's media and communication components are represented as domains in control of the agent. The agent may, in some cases be responsible for manually changing state of a domain by signing out of a queue and working e-mails instead of answering calls or, perhaps, by logging out of the system when leaving his or her work station and so on. In other embodiments automated detection mechanisms may be employed within the operational software of each communications medium or domain to determine current state of activity within the specific domain.

In the case described above, presentity 1105 may be maintained in memory at a workstation or system memory (automata) or in a central database. In this case presentity 1105 has the state changes first as a result of driving events (agent activity). The updates to presentity 1105 can be communicated to data store 1112 through monitor 1110 or global presence 1111 for tracking purposes and to perform computations related to agent accessibility (full, partial, or none) to a full range of skills supported by data store 1112 based on results gleaned from presentity 1105.

In one embodiment a requesting principal may first access data store 1112 to enquire current status of another principle. In this case monitor 1110, also termed a watcher by the inventor, or global presence entity 1111 would access the appropriate presentity 1105 and upload the most recent information to the database. It is noted herein that it is not necessary to continually update and report an entities current presence information if there are no events that result in a need for the updated information. If an event does occur all updating and synchronization of data with a data store can be performed at the time of the request. For example if the target principal is an automated outbound dialing system restricted by a number threshold of outbound calls in queue, then the current updated state of number of calls left in queue can be synchronized to the data store when an event occurs that requires the information. The presence model for the system can be generated on the fly. In this way unnecessary database writes and synchronization operations are eliminated.

In a preferred embodiment, as events occur requesting any given principle's presentity operating within the system domain any updated data newer than data of a last access are synchronized to data store 1112, which may then compute and add some new availability information (state) based on the current state of events so that a requesting principle may simply access the appropriate presentity to obtain the updated information.

Using the system of the invention, state information can be gleaned from presentity 1105 as it occurs. The state information can be used to determine routing routines, choice of media in communication, queue planning, system initiation, resource allotment, load balancing, and other communication center functions. Traditional telephony and IPNT software applications can obtain updated presence information from data store 1112 without any modification required. Furthermore, certain specific principals that may be interleaved in one or more communication center activities may access each other's presentity models directly for resolving internal communication-center issues that do not require event routing or other normal treatments. An example would be a single agent transfer to another agent such as a supervisor. Before initiating the transfer the first agent may, from his or her desktop, access the presentity of the supervisor and make a determination of whether to proceed with the transfer based on the returned information. Even in this case, the presentity information may be synchronized with the data store to enable computation and return of additional data to the model about resources that based on the information in the model may be fully, partially, or non-available to the supervisor at the time of transfer depending on the activity state of the supervisor. The transferring agent can, after accessing the information, make an informed human decision as to whether or not the transfer is likely to be of help to the client.

In one embodiment, a principle such as an agent may be logged into the communication center system (LAN) using a device that is not capable of full database access. While he is not at his station, he or she is not completely logged out of the system because there is still some availability at some functional level. In such a case, his presentity model will reflect that he is away from his workstation but is answering his cell phone and has limited access to the database through a LAN-connected PDA.

By accessing his presentity information, routing software (as an accessing principle) can be set up to route only calls destined to that particular agent that are waiting in queue wherein such calls can be successfully resolved given the agents current means of communication and limited accessibility to the database. Those calls in queue waiting for that particular agent wherein full customer service and product support are required to facilitate successful resolution can be re-assigned to another agent whose presentity shows full skill availability.

One with skill in the art will appreciate that IMPP can be used as communication between all center members whether human or no or whether they are aggregated as groups or not. Members can include database software and traditional communication-center functional applications like routing software, tracking software, queuing software, and the like. Using IMPP with database resolution down to individual state blocks enables an accurate and current picture of activity state and availability of any given communication center principle. Instant messages propagated back and forth between entities can be response notifications based on requests of a principle, or pushed as periodic status change notifications to a monitoring application. For example, as a principle evolves in activity state, each actual state change can be considered an event in an event-driven system such that a current presence report is always immediately available. Accessing the presence information is also event driven. For example, if there are no requests logged or active within the communication system dealing with a particular principle, then there is no activity spawned to access information about the principle. This concept is event-driven access. An example of events in this case would be a number of calls waiting in queue for a particular agent. Each call as it comes up for treatment will be an event that spawns activity, for example, of a routing application to request and obtain most recent presence information on the agent before final routing determination.

In one embodiment, the system of the invention can be used as an event driven notification system to report state changes resulting from components that have failed or are down for maintenance. For example, if a principle is an e-mail server wherein a portion of mails designated for center processing require automated e-mail responses, and the automated response server is down for repair, then the presence information of that response system will be reported as down and the mails may be directed instead to live agents assigned to take over for the down machine.

The method and apparatus of the invention can be applied to any type of communication center that supports digital processing and communication. Applicable networks include the Internet, Ethernets, WANs, LANs and proprietary networks. Resolution of COST events in a CTI sense can be directed according to presence reporting in terms of routing, queuing, data forwarding, automated response, creative interaction through IVR, and so on.

In one embodiment, a COST event may trigger presence information reporting that results in a creative IVR interaction informing the caller that the agent he is trying to reach can take the call on a cell phone outside of the center and has limited access to order information, would this state still be acceptable or do you wish to transfer to another agent with access to a full skill set?

IMPP for Queue Processing and Resource Allocation

In another unique aspect of the present invention, IMPP or another suitable presence protocol (PP) is used for interacting with a master virtual queue and using information from the queue to plan resources required to optimally handle the queued events.

Figure 12:
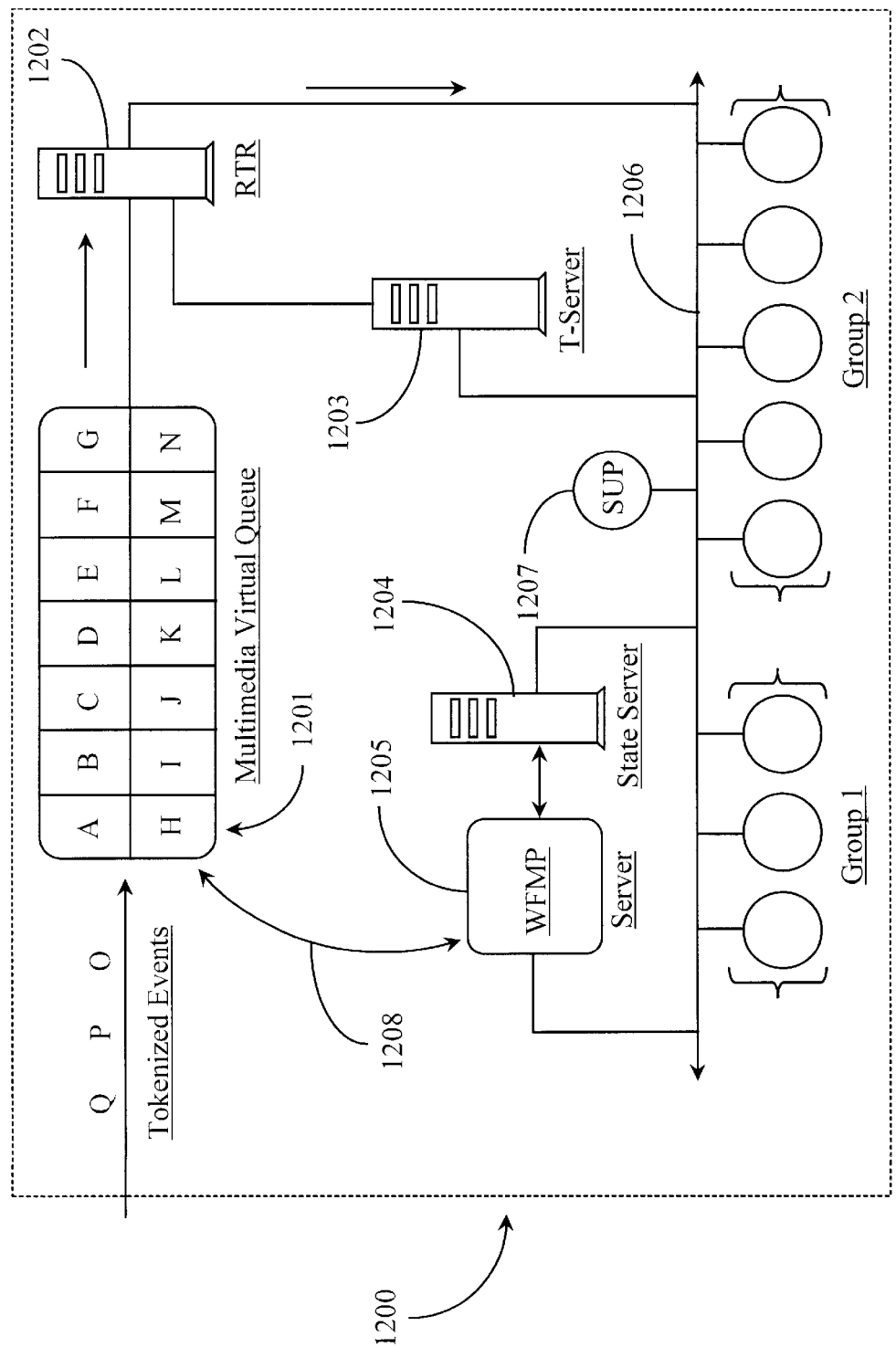
FIG. 12 is a block diagram illustrating a multimedia communication center queuing and routing system according to an embodiment of the present invention.

FIG. 12 is a block diagram illustrating a multimedia communication center 1200 including a queuing and routing system according to an embodiment of the present invention. Multimedia center 1200 is analogous in most respects to multimedia communication-center 1000 of FIG. 10, with an exception of how incoming events are processed in queue and what resources are used for final destinations for event routing within the center.

Center 1200 has a LAN 1206 operational therein and adapted for full multimedia event delivery and full Internet protocol support including IMPP protocols. LAN 1206 connects communication center resources for data access and share as well as providing a conduit for center/client communication over a wide variety of media types.

In this example, there are 2 illustrated resource groups connected to LAN 1206. These are group 1 and group 2. Groups 1 and 2 may be human agents working in the center or they may be automated systems or a combination of agents and automated systems. For the purpose of discussion, it will be assumed that groups 1 and 2 are organized as separate resource groups such as, for example, a customer account management resource (assume group 1) and a technical support resource (group 2). One with skill in the art of resource management will appreciate that in actual practice combinations and groupings of center resources are virtually unlimited in description and allocation.

In the case of live agents and following the example presented herein, group 1 consists of a plurality of LAN-connected agents that are dedicated to helping clients with their account information such as billing questions, collection operations, new account set-up, taking orders, and so on. Group 2 consists of a plurality of live agents dedicated to provision of technical support, trouble-shooting, and the like in this example. Each agent in both groups 1 and 2 may be assumed to be stationed in a LAN-connected workstation having, at bare minimum, a LAN-connected PC with a video display unit (VDU). Other types of equipment not shown such as IP telephones, fax machines, mobile devices, pagers, and so on may be present and may compliment agent capabilities within and externally from any given stationary workstation.

Communication center 1200 has a multimedia-capable virtual queue 1201 provided therein and adapted to receive tokenized information about real incoming events within the communication centers event-receiving and handling (routing) system or systems. In this example, queue 1201 is illustrated as full of events A–N with events O, P, and Q in the process of being queued or just entering queue 1201. It will be appreciated that events A–Q may represent events of any type of media supported within center 1200 such as telephone calls, IP voice calls, e-mails, chat initiation events, facsimiles, video mails, conference requests, IMPP-based communication events, and so on. Each represented event is tokenized with selected information associated with the event. Information included in token representation of the events may include but is not limited to event origination identification, routing destination identification, media type identification, purpose-of-event information and in some cases client presence information for call-back purposes.

There may be a variety of priorities set within the domain of queue 1201. Priority assignment may be based on any one or more of several criteria including media type, client identification, purpose-of-event information, contribution value from the client, and other criteria. There are many possibilities. Queue 1201 is mixed in the sense that represented events may include any or all media types supported by center equipment. Actual routing of events may be carried out by different routing systems connected to real queues within the center that are represented by virtual queue 1201. Such sub-queues in a preferred embodiment of the invention take immediate direction from disposition of events within virtual queue 1201. For example, if there are COST telephony events waiting at a queue associated with a central telephony switch and those events are represented in queue 1201, then the processing performed on the token events facilitates and orders the routing routines and system for making the connections to the final destinations, which could be COST telephones in agent workstations.

A virtual router 1202 is provided within center 1200 and is connected for event processing to virtual queue 1201. Like queue 1201, router 1202 works with representations of real events and orders appropriate routers within center 1200 to route their media types according to determination made in conjunction with queue 1201. However, in one embodiment wherein center 1200 is a pure IPNT center, router 1202 may be an actual IP router and can route all events in a pure multimedia sense. In this case, all events are routed with notification over a LAN connection illustrated between router 1202 and LAN 1206. Final destinations in this example are the connected agents organized in groups 1 and 2.

A T-server 1203 (which is a Computer Telephony Integration {CTI} server) is provided within communication center 1200 and is connected directly to router 1202 and to LAN 1206. T-server 1203 executes all of the routing rules and routines required for successful routing of all media types in this case. T-server 1203 may also have an external connection to a similar server at network level such as within a telephony network as described with reference to communication center 1000 of FIG. 10 above. The connection between T-server 1203 and LAN 1206 enables configuration and update of the server (via LAN) and extends routing routine execution capability to individual agent desktop computers in one embodiment known to the inventor.

LAN 1206 also supports an agent workstation 1207 to be operated by a supervising agent (SUP). An agent at workstation 1207 has overriding capabilities to perform resource allotment changes and other configurations typical of resource management capabilities. In this example, it may be assumed that the supervising agent has set up the resource allocation parameters for groups 1 and 2. Therefore, if necessary, the supervising agent can change, modify and reallocate those resources. It is noted herein that the supervising agent has assigned a larger number of agents to perform technical support (group 2) and a smaller number of agents to perform account management (group 1). This decision is primarily based on current event handling load in typical communication center environments, and is determined after event processing has occurred. In other words, in a very busy environment, supervisor 1207 is always playing catch-up to insure enough of the right resources are available to handle the event load as it occurs.

A state server 1204 is provided within center 1200 and adapted to serve real-time state information about communication center resources. State server 1204 is analogous to state server 1019 described with reference to FIG. 10 above. Server 1204 is IMPP-enabled and is adapted to serve current data regarding resources of the center and for synchronizing data with various systems. A data store for actually storing the data is not illustrated but may be assumed to be present. Server 1204 serves resolute information about agents and/or systems operating within center 1200. The information is presence-reportable information including particular state information blocks associated with database tuples with resolution down to real-time status snippets of agents and systems as may be affected by ongoing center activity. Server 1204 has a direct LAN connection to LAN 1206 and has access to reporting mechanisms pertinent to each domain of each agent or system operating on LAN 1206.

A novel server 1205 is provided within center 1200 and adapted to provide workforce management and planning (WFMP) services for center 1200. Server 1205 will hereinafter be referred to in this specification as WFMP server 1205. WFMP 1205 is IMPP-enabled and connected directly to queue 1201, which is also IMPP-enabled, by a separate network 1208. During operation, WFMP server 1205 interrogates queue 1201 using an instant message protocol about events represented therein. Each event represented has a presence and property-state information associated with it. For example, a voice over IP call will have a media type, and origination ID, a destination request ID, and state information regarding the purpose of the event. Other types of events will have differing presence and state information associated with them. Server 1205 has the capability of aggregating all of the information for a portion of or all of queue 1201 in a single or in a series of interactions.

For example, one IMPP interaction between server 1205 and queue 1201 may be used to obtain all of the pertinent COST event data represented in queue 1201, while e-mail data may be communicated in a second interaction and so on. It will be appreciated that the contents of queue 1201 are constantly changing with respect to the amount of unprocessed events, their types and parameters. Therefore the frequency of access of queue 1201 from server 1205 is set at a relatively high level for each media type represented.

WFMP software running on server 1205 also has data access to state server 1204. State server 1204, as previously described, serves current state data on the presence state and resolute activity states of all of the LAN connected agents and, in some cases automated systems. In this example, all of the agents in groups 1 and 2 have their presence and state activity data published to server 1204 by push or pull method. WFMP server 1205 also has a direct LAN connection and can also, if desired, access agent presence and activity data via LAN.

WFPM server 1205 has additional data and communication access capability to T-server 1203 and to RTR 1202 via LAN 1206. WFMP 1205 is adapted to access and analyze needs and requirements associated with events in queue 1201 and compare those findings with state data served by server 1204 and formulate recommendations regarding near term resource allocation to best handle the current events stacked in queue. Presence information plays a large roll in enabling WFMP software to formulate accurate real-time assessments of a current communication-center queuing and routing environment. Instant messaging is used as a medium of communication between all involved components.

An example of a resource assessment and allocation recommendation against current queue requirements would be a case wherein WFMP server accesses queue 1201 via link 1208 and interrogates the queue for all waiting events that require account management services provided by agent group 1. Assume that a current snapshot result of queue activity shows that events A–K are waiting for account services while events L, M, and N are waiting for technical service provided by group 2. For the instant snapshot, it is noted that resources are not optimally configured for working the queue.

WFMP 1205 accesses state of groups 1 and 2 after interrogating queue 1201 from state server 1204. A comparative process begins within server 1205 wherein near term needs (current queued event requirements) are compared against resource availability and allocation parameters. WFMP determines during this process that more resources need to be diverted from group 2 in this case to group 1 to best handle the current load of queue 1201. A message is formulated within server 1205 containing the resource re-allocation recommendations and the message is sent, in this case to supervising agent 1207 over LAN 1206. The message is in a preferred embodiment an instant notification that informs the supervisor of a proposed action of diverting resources temporarily to help with the events in queue that require account management services.

The supervising agent at station 1207 receives the message and can make the appropriate resource allocation modifications through instant messaging to individual agents of group 2 to break off and join with group 1. At a next interrogation interval, WFMP 1205 will perform a new assessment and recommendation sending the recommendation to the supervising agent.

In one embodiment, certain simple resource allocation orders may be issued to target resources by WFMP software through server 1205 without supervisor involvement. These may be automated resources such as routing systems, interaction systems, or response systems, as well as live agent re-assignment orders. It is noted herein that the allocation parameters of this example, group 1 (account management) and group 2 (technical service) is a simple example of allocating resources based on purpose of incoming event. In other embodiments, resources may be allocated based on other criteria such as media type required of incoming events, callback parameters for outbound dialing campaigns, and other mixes of criteria that may be represented by queue 1201.

In still another embodiment, presence information regarding live agents may be predicted by WFMP software by virtue of data access to individual agent schedules. For example, WFMP may drop agents from re-allocation recommendations if those particular agents will be unavailable due to shift changes, vacation schedules, and so on. Moreover, some of those same resources may be reserved intelligently through a recommendation by WFMP that lunch schedules be delayed because of current workload.

In still another embodiment, WFMP may have limited access through LAN connection to agents that are not at their workstations such as remote agents similar to agent 1018 described with reference to FIG. 10 above. In this case, the agent in question may be allocated to take calls for group 2 instead of group 1 because of access to technical knowledge and limited access to account management service resources. Supervising agent 1207 may configure T-server 1203 to route certain events to like agents using their personal cell phones. T-server 1203 forwards the control routine to Router 1202 to route the events.

In still another embodiment, threshold rules or constraints may apply to WFMP recommendations in order to lessen the frequency of resource re-allocation recommendations received by supervising agent 1207. Thresholds may be constructed from possible queue states in terms of content requirements and time waiting for events with no response. For example, in the first case using the simple example of groups 1 and 2, a resource re-allocation recommendation may not be issued until a snapshot of queue activity reflects an event-purpose shift from technical service requirements to account management requirements above a certain percentage of events waiting. In the second case, the threshold for issuing a re-allocation of resource recommendation may occur only if the resource-starved events begin to breach a time threshold for waiting for a response. Once the time threshold is reported to be breached a recommendation to re-allocate resources is issued to add resources for those particular events.

In yet another embodiment, statistical information resulting from actual tracking of queue and routing interaction over a particular time period of a campaign may be used by WFMP to fine tune recommendations by using probability figures to anticipate incoming events predicting the quantity and nature of those events up to a specified window of time ahead of queue registration. Such probability statistics can be generated from information accessed from a historical database and used to help determine resource re-allocation recommendations. In this case events O, P, and Q would be anticipated by WFMP software and statistically defined by probability factors.

One with skill in the art of intelligent routing and queue management will recognize that the method and apparatus of the invention provides a much needed assistance in resource planning by pre-analyzing queue requirements well ahead of required event processing and by sending recommendations to resource-responsible entities minutes before those resources are actually required. As a result, service optimization and event-handling efficiency can be continually improved for clients of the center.

Figure 13:
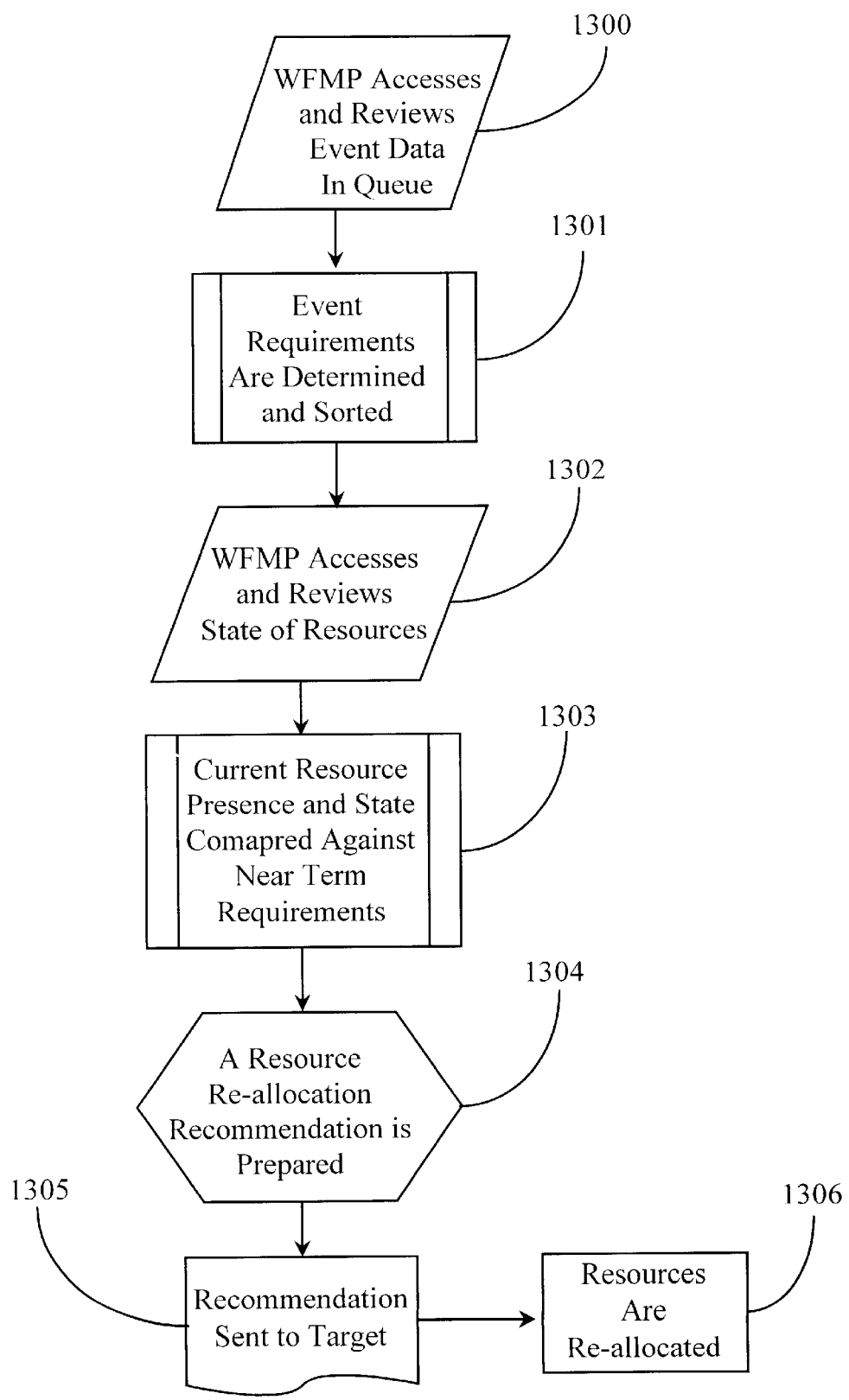
FIG. 13 is a process flow diagram illustrating basic steps of queue processing and resource allocation according to an embodiment of the invention.

FIG. 13 is a process flow diagram illustrating basic steps of queue processing and resource allocation according to a preferred embodiment of the invention. At step 1300, WFMP software accesses a communication-center master virtual queue (VQ) and reviews data about events registered therein. Data about events includes but is not limited to media type of event, event origination ID, event destination ID, and purpose of event data. At step 1301, event requirements are determined per event and sorted for priority. In this step processing is dependent in part of existing parameters and constraints set up by the hosting enterprise. In a media specific example where internal routing is determined only by media type, requirements may simply be media type and destination ID per event wherein the data is quantified and sorted by number of events waiting of each type.

At step 1302, WFMP accesses and reviews presence and state activity information of the current allocated resources for handling the events. It is noted herein that both environments, the events in queue and the state of resources allocated are evolving and changing as queue processing and routing ensues. Therefore, each transaction between WFMP and the queue and between WFMP and the resource presence and state information provides only the most recent snapshot of each environment. In one embodiment, steps 1300 and 1302 occur simultaneously in a multitask scenario to optimize accuracy.

At step 1303, current presence and state information of allocated resources is compared against near term event requirements of events in queue to determine if a recommendation is necessary. In some cases, it may be determined in step 1303 that no further action is required in which case the process resolves back to step 1300. It is noted herein that through various connections illustrated in FIG. 12, WFMP software has informational access to all un-allocated resources. Therefore, this knowledge is incorporated in step 1304 wherein WFMP software, if required, generates a resource re-allocation recommendation based on the most recent information. In a preferred embodiment of the invention, the recommendation is in the form of an instant message notification containing the data as an attachment or in the form body.

At step 1305, the resource recommendation is sent to a responsible entity like a supervising agent responsible for configuring center resources to respond to queued events. The recommendation may be received as an alert wherein the resources recommended for addition, subtraction, diversion, etc. are identified and known to be available according to the recommendation. In one embodiment, the target is an automated system instead of a live agent. For example, a communication center may employ 2 automated e-mail response servers wherein only one is currently allocated to process e-mails. A recommendation in this case may simply be targeted to the off-line server with an order to power up and begin processing from the pool.

At step 1306 the resources are re-allocated according to the latest recommendation. Depending on the time frame within the virtual queue, and perhaps any overriding priority considerations, resource re-allocation may occur several minutes before the resources are actually required. The exact amount of lead-time will, of course, vary according to conditions. For an empty or starved queue, the system may not be required at all. However, when the queue is near full and estimated waiting times are relatively high, then resource re-allocation can be performed well ahead of time to help process the waiting events more expediently.

It will be apparent to one with skill in the art that the process steps described in this example may be varied somewhat by subroutine and order without departing from the spirit and scope of the invention. For example, at step 1306 the target entity responsible for resources may override a recommendation and may elect not re-configure resources unless a more urgent recommendation arrives. Moreover recommendations may also be configured to provide dropped event probabilities and other consequence data if a recommendation is not initiated into an order. Further, it should be understood that the invention in some embodiments is not limited to IMPP protocol, but other protocols may even be more suitable than IMPP.

In one embodiment at step 1302, the presence and state information may be reported directly to the WFMP server from individually monitored resources so that it may have local data access to the most recent information. In another embodiment the server access a data store for the most recent information as it is synchronized thereto periodically. In still another embodiment, an additional subroutine may be provided for gauging one or more threshold levels applied to queue parameters before going ahead with preparation of a recommendation at step 1304.

The method and apparatus of the present invention has been demonstrated herein to have patentable weight in a variety of different embodiments and therefore should be afforded the broadest possible scope under examination. Only the claim language provided below limits the spirit and scope of the present invention.

What is claimed is:

1. In a communication center, a software application for recommending workforce resource allocation in a communication center based on requirements of events represented in a communication-center queue comprising:

a first function for accessing information from the queue;

a second function for accessing information from a data source about workforce availability and state information;

a processing function for processing queue information and workforce information; and a message generation and delivery function for generating a workforce allocation recommendation based on results from processing and sending the recommendation to a target entity;

characterized in that the application periodically accesses the queue and the data source to obtain the most recent information for processing, and generates periodic recommendations based on real-time requirements of events and availability states of resources.

2. The software application of claim 1 wherein the communication-center queue is a virtual queue capable of representing multimedia events.

3. The software application of claim 2 wherein represented events include COST calls, VoIP calls, e-mails, voice-mails, video calls, session initiation events, and IMPP-based communication events.

4. The software application of claim 1 wherein the workforce includes both live agents and automated systems.

5. The software application of claim 1 wherein event requirements include media type, requested routing destination identification, and event purpose information.

6. The software application of claim 1 wherein the first function is enabled by a data network link from a server hosting the application and a server hosting the queue.

7. The software application of claim 1 wherein the second function is enabled by a data network link from a server hosting the application and a server functioning as the data source hosting the workforce information.

8. The software application of claim 1 wherein the data source serves information according to a presence protocol.

9. The software application of claim 1 wherein the processing function performs a comparative analysis between the queue requirements and the workforce information the results thereof used to form the recommendation.

10. The software application of claim 1 wherein the recommendation is an IMPP-based message.

11. The software application of claim 1 wherein the target entity is a supervising agent responsible for workforce allocation.

12. The software application of claim 1 wherein the target entity is an automated system and the recommendation is a direct order to that system.

13. The software application of claim 1 further including a third function for making interface with and accessing data from a historical database for the purpose of generating probability statistics concerning incoming events yet to be registered into the queue.

14. The software application of claim 13 wherein the generated probability statistics are used to help generate recommendations.

15. The software application of claim 1 wherein the presence information includes availability information, individual agent schedule information, and resolute activity state information.

16. In a communication center environment, an automated system for generating workforce resource allocation recommendations based on requirements for queued events and current workforce presence and state parameters comprising:

a first server having network access to the queued events;

a second server having network access to the first server and having network access to the workforce presence and state parameters; and a software application running on the first server, the application including a processing function for processing queue information and workforce information; and a message generation and delivery function for generating a workforce allocation recommendation based on results from processing and sending the recommendation to a target entity;

characterized in that the recommendation provides direction for allocation of resources ahead of a time when the considered events would require actual event handling.

17. The automated system of claim 16 wherein the communication-center queue is a virtual queue capable of representing multimedia events.

18. The automated system of claim 16 wherein queued events include COST calls, VoIP calls, c-mails, voice-mails, video calls, and session initiation events, and IMPP-based communication events.

19. The automated system of claim 16 wherein the workforce includes both live agents and automated systems.

20. The automated system of claim 16 wherein current event requirements include media type, requested destination identification, and event purpose information.

21. The automated system of claim 16 wherein the workforce presence and state parameters are server by the second server according to IMPP-based messaging.

22. The automated system of claim 16 wherein the processing function performs a comparative analysis between the queue requirements and the workforce information the results thereof used to form the recommendation.

23. The automated system of claim 16 wherein the target entity is a supervising agent responsible for workforce allocation.

24. The automated system of claim 16 wherein the target entity is an automated system and the recommendation is a direct order to that system.

25. The automated system of claim 16 wherein the presence information includes availability information, individual schedule information, and resolute activity state information.

26. A method for anticipating resources needed for events represented in a communication-center queue comprising steps of:

(a) using a software application, accessing the queue to gain access to requirements and parameters of events represented therein;

(b) quantifying and sorting the accessed requirements;

(c) using the same software application accessing a data source to gain access to presence and state information of center resources;

(d) performing a comparative analysis of requirements against available resources;

(e) generating a resource allocation recommendation based on the results of analysis; and (f) sending the recommendation to a target entity responsible for resource allocation.

27. The method of claim 26 wherein in step (a) the software application includes a first function for accessing information from the queue; a second function for accessing information from a data source about workforce availability and state information; a processing function for processing queue information and workforce information; and a message generation and delivery function for generating a workforce allocation recommendation based on results from processing and sending the recommendation to a target entity.

28. The method of claim 26 wherein in step (a) requirements and parameters include media type, requested event destination identification, event origination identification and event purpose information.

29. The method of claim 26 wherein in step (b) the requirements are prioritized by pre-selected criteria.

30. The method of claim 26 wherein in step (c) data access is based on a push model.

31. The method of claim 26 wherein in step (c) data access is based on a pull model.

32. The method of claim 26 wherein in step (c) the data source is a server.

33. The method of claim 26 wherein in step (c) the presence and state information includes work schedules, shift change information, and resolute activity states of differing media types.

34. The method of claim 26 wherein in step (e) knowledge of un-allocated resources is also incorporated in recommendation generation.

35. The method of claim 26 wherein in step (f) the target entity is a supervising agent.

36. The method of claim 26 wherein the target entity is an automated system and the recommendation is a direct order.

* * * * *